United States Patent
Xu et al.

(10) Patent No.: US 11,347,365 B2
(45) Date of Patent: May 31, 2022

(54) TOUCH SUBSTRATE, TOUCH DISPLAY PANEL AND TOUCH DISPLAY APPARATUS

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Jiawei Xu, Beijing (CN); Zhao Dong, Beijing (CN); Wenjin Fan, Beijing (CN); Le Li, Beijing (CN); Bisheng Li, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/422,100

(22) PCT Filed: Aug. 14, 2020

(86) PCT No.: PCT/CN2020/109193
§ 371 (c)(1),
(2) Date: Jul. 9, 2021

(87) PCT Pub. No.: WO2021/027922
PCT Pub. Date: Feb. 18, 2021

(65) Prior Publication Data
US 2022/0113838 A1    Apr. 14, 2022

(30) Foreign Application Priority Data

Aug. 14, 2019  (CN) .......................... 201910750939.2

(51) Int. Cl.
*G06F 3/041* (2006.01)
*G06F 3/044* (2006.01)

(52) U.S. Cl.
CPC .......... *G06F 3/0446* (2019.05); *G06F 3/0412* (2013.01); *G06F 3/0445* (2019.05);
(Continued)

(58) Field of Classification Search
CPC combination set(s) only.
See application file for complete search history.

(56) References Cited

U.S. PATENT DOCUMENTS

2016/0224181 A1  8/2016 Kim et al.
2018/0113345 A1  4/2018 Song et al.
(Continued)

FOREIGN PATENT DOCUMENTS

CN    105579942 A    5/2016
CN    106502454 A    3/2017
(Continued)

OTHER PUBLICATIONS

First Office Action of Priority Application No. CN 201910750939.2 dated Dec. 30, 2020.

*Primary Examiner* — Deeprose Subedi
(74) *Attorney, Agent, or Firm* — IP & T Group LLP

(57) ABSTRACT

A touch substrate includes a base, a first electrode layer, a dielectric layer and a second electrode layer that are sequentially stacked on the base. The first electrode layer has first electrode regions and first auxiliary regions, and the second electrode layer has second electrode regions and second auxiliary regions. The first electrode layer includes a first mesh electrode including first mesh sub-electrodes and second mesh sub-electrodes. A region where each first mesh sub-electrode is located overlaps a second electrode region, and a region where each second mesh sub-electrode is
(Continued)

located overlaps a second auxiliary region. The second electrode layer includes a second mesh electrode including third mesh sub-electrodes and fourth mesh electrodes. A region where each third mesh sub-electrode is located overlaps a first electrode region, and a region where the fourth mesh sub-electrode is located overlaps a first auxiliary region.

20 Claims, 17 Drawing Sheets

(52) U.S. Cl.
CPC .. *G06F 3/0448* (2019.05); *G06F 2203/04111* (2013.01); *G06F 2203/04112* (2013.01)

(56) References Cited

U.S. PATENT DOCUMENTS

| | | |
|---|---|---|
| 2019/0004657 A1 | 1/2019 | Koudo et al. |
| 2019/0187825 A1* | 6/2019 | Chen .................... G06F 3/0446 |
| 2020/0142541 A1 | 5/2020 | Miura et al. |
| 2021/0149523 A1 | 5/2021 | Zhong et al. |

FOREIGN PATENT DOCUMENTS

| | | |
|---|---|---|
| CN | 108700971 A | 10/2018 |
| CN | 208888789 U | 5/2019 |
| CN | 109976566 A | 7/2019 |
| CN | 110489014 A | 11/2019 |
| JP | 2017-91018 A | 5/2017 |
| WO | 2019/021572 A1 | 1/2019 |

\* cited by examiner

TOUCH SUBSTRATE, TOUCH DISPLAY PANEL AND TOUCH DISPLAY APPARATUS

CROSS-REFERENCE TO RELATED APPLICATIONS

This application is a national phase entry under 35 USC 371 of International Patent Application No. PCT/CN2020/109193, filed on Aug. 14, 2020, which claims priority to Chinese Patent Application No. 201910750939.2, filed on Aug. 14, 2019, which are incorporated herein by reference in their entirety.

TECHNICAL FIELD

The present disclosure relates to the field of display technologies, and in particular, to a touch substrate, a touch display panel and a touch display apparatus.

BACKGROUND

Metal mesh touch screens have been widely used in the display field due to their advantages of low resistance, uniform capacitance and the like.

SUMMARY

In one aspect, a touch substrate is provided. The touch substrate includes a base, and a first electrode layer, a dielectric layer and a second electrode layer that are stacked in sequence on the base. The first electrode layer has a plurality of first electrode regions and a plurality of first auxiliary regions that extend in a first direction and are alternately arranged in sequence in a second direction, and the second electrode layer has a plurality of second electrode regions and a plurality of second auxiliary regions that extend in the second direction and are alternately arranged in sequence in the first direction. The first direction intersects the second direction. The first electrode layer includes a first mesh electrode disposed in each first electrode region. The first mesh electrode includes a plurality of first mesh sub-electrodes and a plurality of second mesh sub-electrodes that are alternately arranged in the first direction and are electrically connected in sequence. A region where each first mesh sub-electrode is located overlaps a second electrode region, a region where each second mesh sub-electrode is located overlaps a second auxiliary region, and a density of cells of the first mesh sub-electrode is less than a density of cells of the second mesh sub-electrode. The second electrode layer includes a second mesh electrode disposed in each second electrode region. The second mesh electrode includes a plurality of third mesh sub-electrodes and a plurality of fourth mesh sub-electrodes that are alternately arranged in the second direction and are electrically connected in sequence. A region where each third mesh sub-electrode is located overlaps a first electrode region, a region where each fourth mesh sub-electrode is located overlaps a first auxiliary region, and a density of cells of the third mesh sub-electrode is less than a density of cells of the fourth mesh sub-electrode.

In some embodiments, a ratio of the density of cells of the first mesh sub-electrode to the density of cells of the second mesh sub-electrode is 1:2 or approximately 1:2. And/or, a ratio of the density of cells of the third mesh sub-electrode to the density of cells of the fourth mesh sub-electrode is 1:2 or approximately 1:2.

In some embodiments, the density of cells of the first mesh sub-electrode is the same or substantially the same as the density of cells of the third mesh sub-electrode. And/or, the density of cells of the second mesh sub-electrode is the same or substantially the same as the density of cells of the fourth mesh sub-electrode.

In some embodiments, mesh electrodes included in the first electrode layer and mesh electrodes included in the second electrode layer each include: a plurality of first electrode lines extending in a third direction, and a plurality of second electrode lines extending in a fourth direction. The plurality of first electrode lines and the plurality of second electrode lines intersect to form cells of the mesh electrode, the third direction intersects the fourth direction.

In some embodiments, a ratio of the density of cells of the first mesh sub-electrode to the density of cells of the second mesh sub-electrode is 1:2 or approximately 1:2, a ratio of a distance between two adjacent first electrode lines in the first mesh sub-electrode to a distance between two adjacent first electrode lines in the second mesh sub-electrode is 2:1 or approximately 2:1; and a ratio of a distance between two adjacent second electrode lines in the first mesh sub-electrode to a distance between two adjacent second electrode lines in the second mesh sub-electrode is 2:1 or approximately 2:1. And/or, a ratio of the density of cells of the third mesh sub-electrode to the density of cells of the fourth mesh sub-electrode is 1:2 or approximately 1:2, a ratio of a distance between two adjacent first electrode lines in the third mesh sub-electrode to a distance between two adjacent first electrode lines in the fourth mesh sub-electrode is 2:1 or approximately 2:1; and a ratio of a distance between two adjacent second electrode lines in the third mesh sub-electrode and a distance between two adjacent second electrode lines in the fourth mesh sub-electrode is 2:1 or approximately 2:1. And/or, the density of cells of the first mesh sub-electrode is the same or substantially the same as the density of cells of the third mesh sub-electrode, a distance between two adjacent first electrode lines in the first mesh sub-electrode is the same or substantially the same as a distance between two adjacent first electrode lines in the third mesh sub-electrode; and a distance between two adjacent second electrode lines in the first mesh sub-electrode is the same or substantially the same as a distance between two adjacent second electrode lines in the third mesh sub-electrode. And/or, the density of cells of the second mesh sub-electrode is the same or substantially the same as the density of cells of the fourth mesh sub-electrode, a distance between two adjacent first electrode lines in the second mesh sub-electrode is the same or substantially the same as a distance between two adjacent first electrode lines in the fourth mesh sub-electrode; and a distance between two adjacent second electrode lines in the second mesh sub-electrode is the same or substantially the same as a distance between two adjacent second electrode lines in the fourth mesh sub-electrode.

In some embodiments, in an orthogonal projection of a combination of the first electrode layer and the second electrode layer on the base, a distance between projections of two adjacent first electrode lines is in a range from 100 µm to 400 µm; and a distance between projections of two adjacent second electrode lines is in a range from 100 µm to 400 µm.

In some embodiments, a line width of each first electrode line is in a range from 3 µm to 10 µm; and a line width of each second electrode line is in a range from 3 µm to 10 µm.

In some embodiments, a shape of cells of a mesh electrode included in the first electrode layer and a shape of cells of a mesh electrode included in the second electrode layer each include at least one of a rectangular shape, a square shape, and a rhombic shape.

In some embodiments, in the second electrode layer, no mesh electrode is provided in a region overlapping the region where the second mesh sub-electrode is located in the second auxiliary region.

In some embodiments, a density of cells of an orthogonal projection of a combination of the first mesh sub-electrode and the third mesh sub-electrode on the base is the same or substantially the same as a density of cells of an orthogonal projection of the second mesh sub-electrode on the base.

In some embodiments, a pattern of the orthogonal projection of the combination of the first mesh sub-electrode and the third mesh sub-electrode on the base is the same or substantially the same as a pattern of the orthogonal projection pattern of the second mesh sub-electrode on the base.

In some embodiments, in the first electrode layer, no mesh electrode is provide in a region overlapping the region where the fourth mesh sub-electrode is located in the first auxiliary region.

In some embodiments, a density of cells of an orthogonal projection of a combination of the first mesh sub-electrode and the third mesh sub-electrode on the base is the same or substantially the same as a density of cells of an orthogonal projection of the fourth mesh sub-electrode on the base.

In some embodiments, a pattern of the orthogonal projection of the combination of the first mesh sub-electrode and the third mesh sub-electrode on the base is the same or substantially the same as a pattern of the orthogonal projection of the fourth mesh sub-electrode on the base.

In some embodiments, the first auxiliary region includes a first auxiliary sub-region overlapping the second auxiliary region; and the second auxiliary region includes a second auxiliary sub-region overlapping the first auxiliary region.

The first electrode layer includes a third mesh electrode disposed in the first auxiliary sub-region; and the third mesh electrode is electrically insulated from the first mesh electrode. The second electrode layer includes a fourth mesh electrode disposed in the second auxiliary sub-region; and the fourth mesh electrode is electrically insulated from the second mesh electrode. A density of cells of an orthogonal projection of a combination of the first mesh sub-electrode and the third mesh sub-electrode on the base is the same or substantially the same as a density of cells of an orthogonal projection of a combination of the third mesh electrode and the fourth mesh electrode on the base.

In some embodiments, a pattern of the third mesh electrode is the same as a pattern of the first mesh sub-electrode. A pattern of the fourth mesh electrode is the same as a pattern of the third mesh sub-electrode.

In some embodiments, the first auxiliary region includes a first auxiliary sub-region overlapping the second auxiliary region; and the second auxiliary region includes a second auxiliary sub-region overlapping the first auxiliary region. The first auxiliary sub-region or the second auxiliary sub-region is provided with a fifth mesh electrode, and a density of cells of an orthogonal projection of the fifth mesh electrode on the base is the same or substantially the same as a density of cells of an orthogonal projection of a combination of the first mesh sub-electrode and the third mesh sub-electrode on the base. The fifth mesh electrode is disposed in the first auxiliary sub-region, the fifth mesh electrode is located in the first electrode layer; and the fifth mesh electrode is electrically insulated from the first mesh electrode. And/or, the fifth mesh electrode is disposed in the second auxiliary sub-region, the fifth mesh electrode is located in the second electrode layer; and the fifth mesh electrode is electrically insulated from the second mesh electrode.

In another aspect, a touch display panel is provided. The touch display panel includes the touch substrate according to any one of the above embodiments.

In yet another aspect, a touch display apparatus is provided. The touch display apparatus includes the touch display panel according to any one of the above embodiments.

In yet another aspect, a touch substrate is provided. The touch substrate has a touch region and a peripheral region surrounding the touch region. The touch substrate includes a base, and a black matrix layer, a first electrode layer, a dielectric layer and a second electrode layer that are stacked in sequence on the base. The black matrix layer is located in the peripheral region. The first electrode layer has a plurality of first electrode regions and a plurality of first auxiliary regions that extend in a first direction and are alternately arranged in sequence in a second direction, and the second electrode layer has a plurality of second electrode regions and a plurality of second auxiliary regions that extend in the second direction and are alternately arranged in sequence in the first direction. The first direction intersects the second direction. The first electrode layer includes a first mesh electrode disposed in each first electrode region, and a plurality of first touch leads disposed in the peripheral region, and the plurality of first touch leads are connected to first mesh electrodes in the plurality of first electrode regions. The second electrode layer includes a second mesh electrode disposed in each second electrode region, and a plurality of second touch leads disposed in the peripheral region, and the plurality of second touch leads are connected to second mesh electrodes in the plurality of second electrode regions. The first mesh electrode includes a plurality of first mesh sub-electrodes and a plurality of second mesh sub-electrodes that are alternately arranged in the first direction and are electrically connected in sequence. A region where each first mesh sub-electrode is located overlaps a second electrode region, and a region where each second mesh sub-electrode is located overlaps a second auxiliary region. The second mesh electrode includes a plurality of third mesh sub-electrodes and a plurality of fourth mesh sub-electrodes that are alternately arranged in the second direction and are electrically connected in sequence. A region where each third mesh sub-electrode is located overlaps a first electrode region, and a region where each fourth mesh sub-electrode is located overlaps a first auxiliary region. In the first electrode layer, no mesh electrode is provided in a region overlapping the region where the fourth mesh sub-electrode is located in the first auxiliary region, and a region overlapping the second auxiliary region in the first auxiliary region is provided with a third mesh electrode that belongs to the first electrode layer, and the third mesh electrode is electrically insulated from the first mesh electrode. In the second electrode layer, no mesh electrode is provided in a region overlapping the second mesh sub-electrode in the second auxiliary region, and a region overlapping a region where the first auxiliary region is located in the second auxiliary region is provided with a fourth mesh electrode that belongs to the second electrode layer, and the second electrode layer is electrically insulated from the second mesh electrode. A desity of cells of the first mesh sub-electrode, a density of cells of the third mesh sub-electrode, a density of cells of the third mesh electrode and a density of cells of the fourth mesh electrode are the same or substantially the same. A density of cells of the second mesh sub-electrode and a density of cells of the fourth mesh sub-electrode are the same or substantially the same. A density of cells of an orthogonal projection of a combination of the first mesh sub-electrode and the third mesh sub-electrode on the base, a density of cells of an orthogonal projection of a combination of the third mesh electrode and the fourth mesh electrode on the base, a density of cells of an orthogonal projection of the second mesh sub-electrode on the base, and a density of cells of an orthogonal projection of the fourth mesh sub-electrode on the base are the same or substantially the same.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings.

In addition, the accompanying drawings to be described below may be regarded as schematic diagrams, and are not limitations on actual sizes of products, and an actual process of a method to which the embodiments of the present disclosure relate.

DETAILED DESCRIPTION

Figure 1:
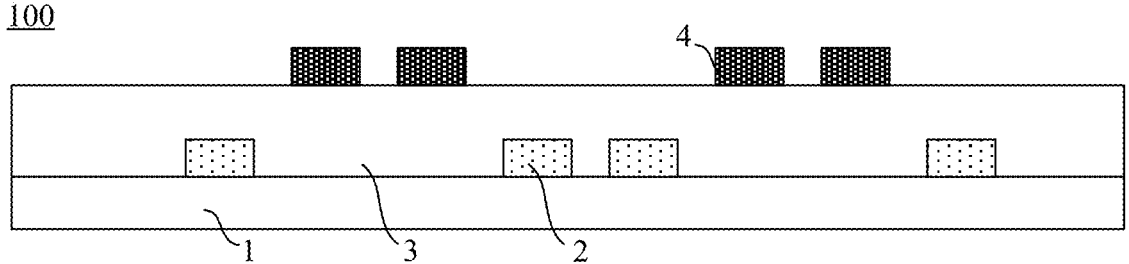
FIG. 1 is a structural diagram of a touch substrate, in accordance with some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive meanings, i.e., "including, but not limited to." In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "a/the plurality of" means two or more unless otherwise specified.

In the description of some embodiments, the term "connected" and its derivatives may be used. For example, the term "connected" may be used in the description of some embodiments to indicate that two or more components are in direct physical contact or electrical contact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, depending on the context, the term "if" is optionally construed as "when" or "in a case where" or "in response to determining" or "in response to detecting". Similarly, depending on the context, the phrase "if it is determined . . . " or "if [a stated condition or event] is detected" is optionally construed as "in a case where it is determined . . . " or "in response to determining . . . " or "in a case where [the stated condition or event] is detected" or "in response to detecting [the stated condition or event]".

The use of the phase "applicable to" or "configured to" herein means an open and inclusive expression, which does not exclude apparatuses that are applicable to or configured to perform additional tasks or steps.

In addition, the use of the phase "based on" is meant to be open and inclusive, since a process, step, calculation or other action that is "based on" one or more of the stated conditions or values may, in practice, be based on additional conditions or values other than those stated.

The term "about" or "approximately" as used herein includes a stated value and an average value within an acceptable range of deviation of a particular value. The acceptable range of deviation is determined by a person of ordinary skill in the art in view of measurement in question and errors associated with measurement of a particular quantity (i.e., limitations of a measurement system).

Exemplary embodiments are described herein with reference to sectional views and/or plan views as idealized exemplary drawings. In the accompanying drawings, thicknesses of layers and sizes of regions are enlarged for clarity. Variations in shape with respect to the accompanying drawings due to, for example, manufacturing technologies and/or tolerances may be envisaged. Therefore, the exemplary embodiments should not be construed to be limited to shapes of regions shown herein, but to include deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of the regions in an apparatus, and are not intended to limit the scope of the exemplary embodiments.

As a size of a metal mesh touch screen increases, for example, in a case where the size of the metal mesh touch screen increases to a large size such as 65 inches or 75 inches, an impedance of a metal mesh electrode in the metal mesh touch screen will increase, thereby resulting in an increase in a load of a driver that drives the metal mesh electrode, and easily reducing touch sensitivity. The impedance of the metal mesh electrode may be reduced by increasing a line width of a metal mesh, but this is easily limited by an optical shadow elimination effect and a bezel of the metal mesh touch screen, and thus an effect of reducing the impedance of the metal mesh electrode is limited.

Figure 2:
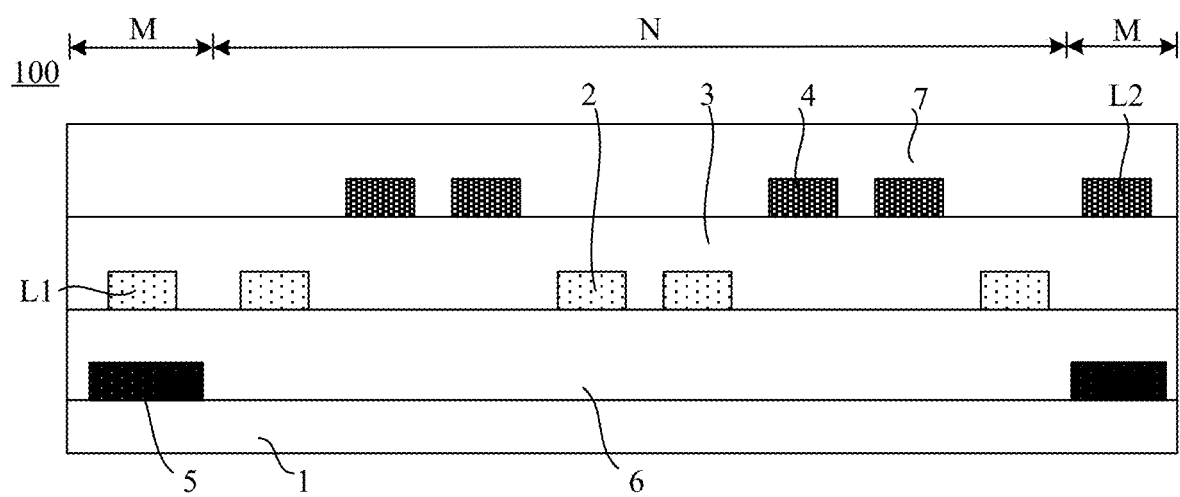
FIG. 2 is a structural diagram of another touch substrate, in accordance with some embodiments of the present disclosure.

Based on this, some embodiments of the present disclosure provide a touch substrate 100. As shown in FIGS. 1 and 2, the touch substrate 100 includes a base 1, a first electrode layer 2, a dielectric layer 3 and a second electrode layer 4 that are stacked in sequence.

There are various structures of the base 1, which may be selectively set according to actual needs.

In some examples, the base 1 may be a flexible base. In this case, the flexible base may be, for example, a polyethylene terephthalate (PET) base, a polyethylene naphthalate two formic acid glycol ester (PEN) base, or a polyimide (PI) base.

In some other examples, the base 1 may be a rigid base. In this case, the rigid base may be, for example, a glass base.

There are various materials of the dielectric layer 3. For example, the material of the dielectric layer 3 may include a resin material with a high insulativity.

Figure 4:
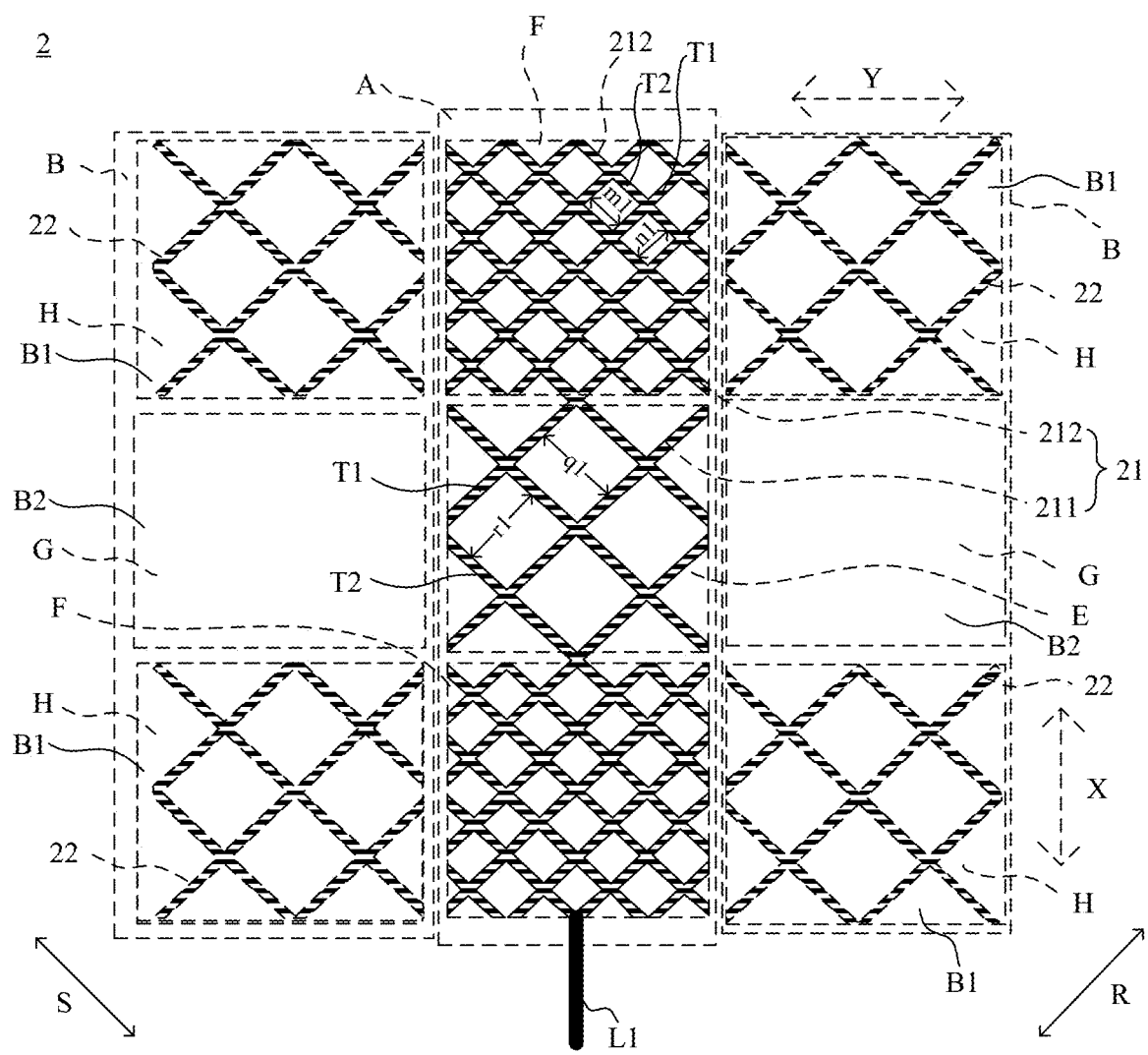
FIG. 4 is a structural diagram of a first electrode layer of a touch substrate, in accordance with some embodiments of the present disclosure.
Figure 5:
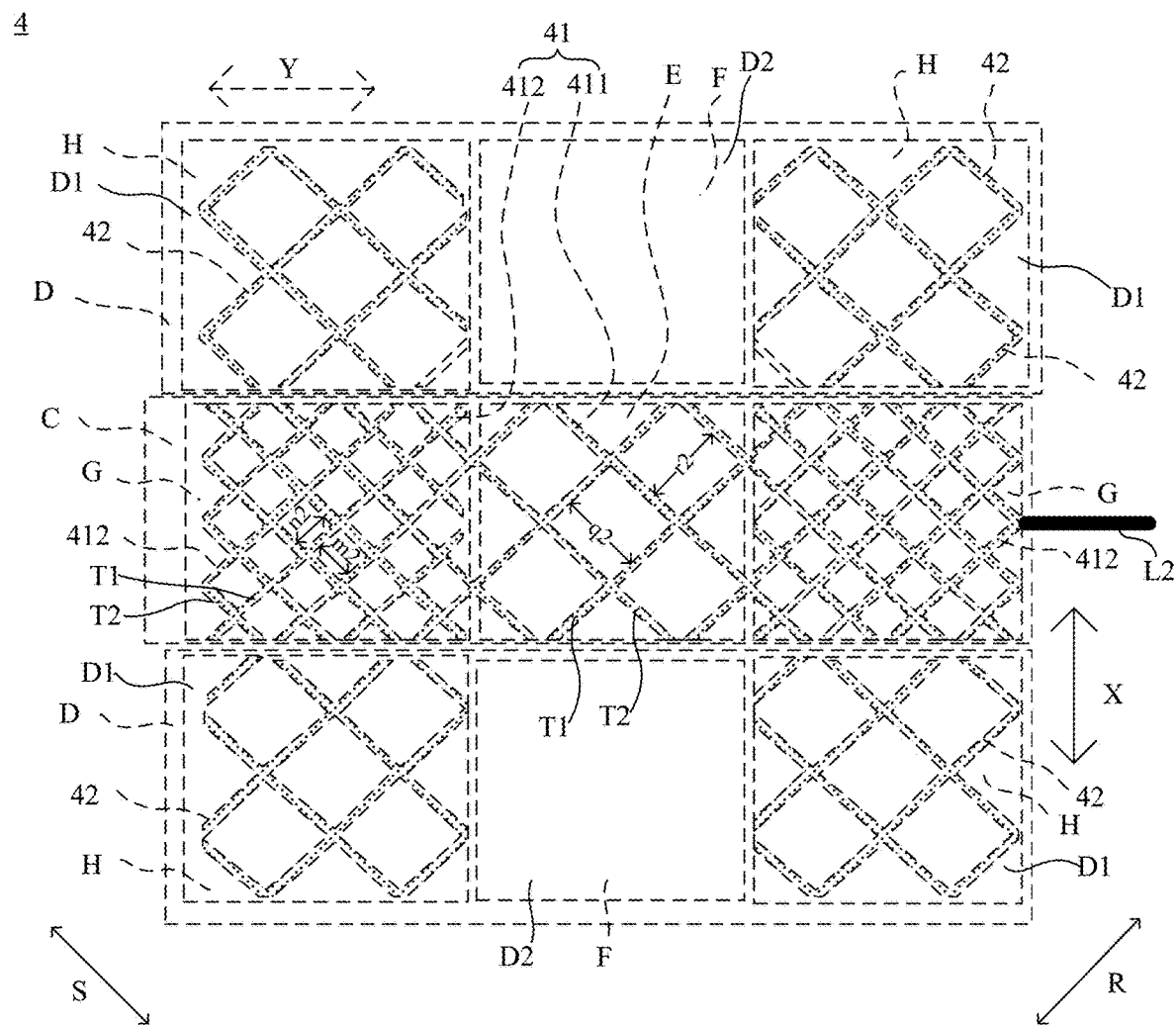
FIG. 5 is a structural diagram of a second electrode layer of the touch substrate, in accordance with some embodiments of the present disclosure.

In some embodiments, as shown in FIGS. 4 and 5, the first electrode layer 2 has a plurality of first electrode regions A and a plurality of first auxiliary regions B that extend in a first direction X and are alternately arranged in sequence in a second direction Y; and the second electrode layer 4 has a plurality of second electrode regions C and a plurality of second auxiliary regions D that extend in the second direction Y and are alternately arranged in sequence in the first direction X. That is, one first auxiliary region B is provided between any two adjacent first electrode regions A, and one first electrode region A is provided between any two adjacent first auxiliary regions B. One second auxiliary region D is provided between any two adjacent second electrode regions C, and one second electrode region C is provided between any two adjacent second auxiliary regions D.

In some examples, the first direction X intersects the second direction Y.

Herein, a magnitude of an included angle between the first direction X and the second direction Y may be selectively set according to actual needs. For example, the first direction X and the second direction Y may be perpendicular to each other, that is, the included angle therebetween is 90°.

In some embodiments, as shown in FIG. 4, the first electrode layer 2 includes a first mesh electrode 21 disposed in each first electrode region A. The first mesh electrode 21 includes a plurality of first mesh sub-electrodes 211 and a plurality of second mesh sub-electrodes 212 that are alternately arranged in the first direction X and are electrically connected in sequence. That is, one second mesh sub-electrode 212 is provided between any two adjacent first mesh sub-electrodes 211, one first mesh sub-electrode 211 is provided between any two adjacent second mesh sub-electrodes 212, and a first mesh sub-electrode 211 and a second mesh sub-electrode 212 that are adjacent are directly electrically connected.

Figure 6:
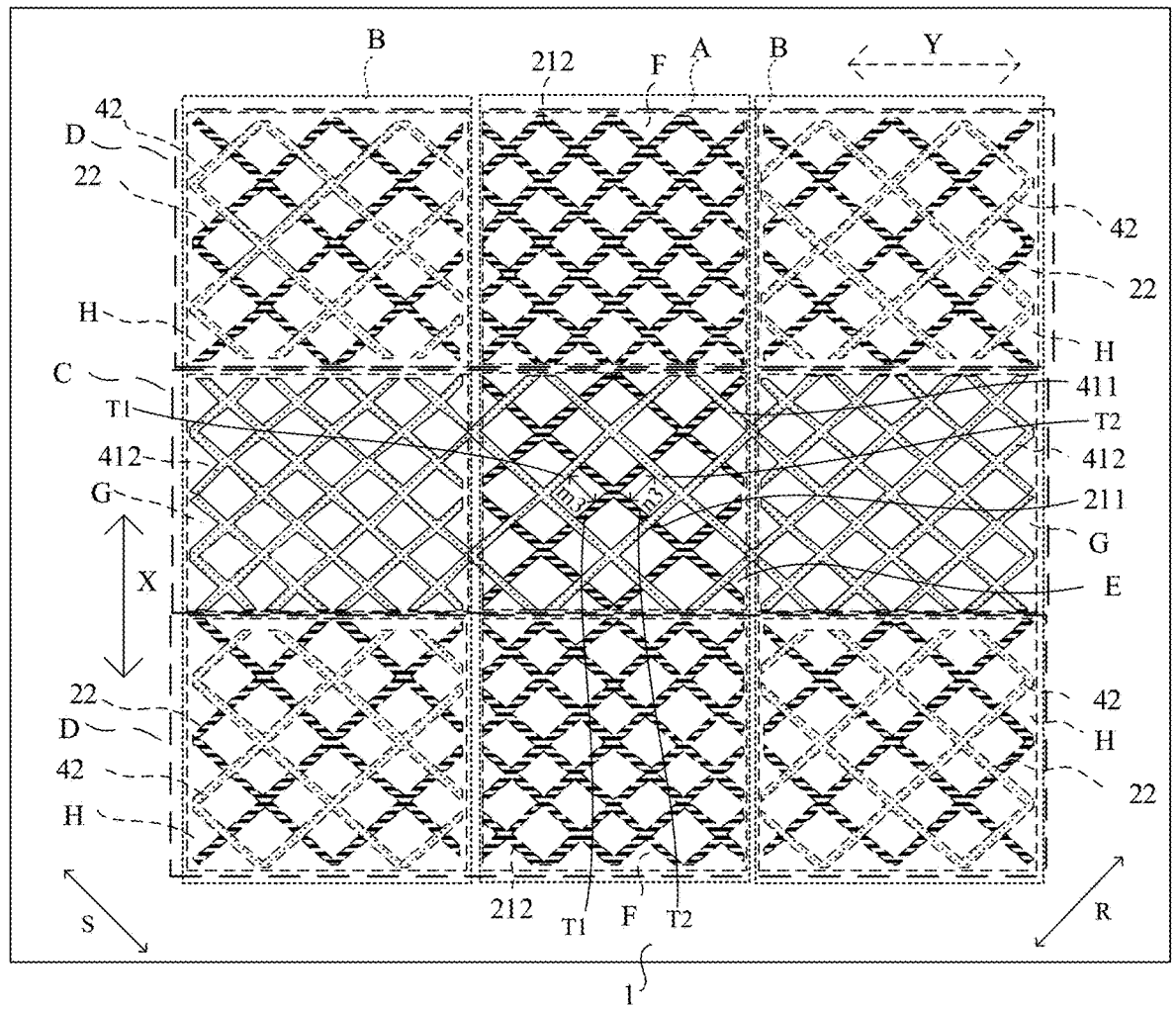
FIG. 6 is a structural diagram of the first electrode layer and the second electrode layer of the touch substrate, in accordance with some embodiments of the present disclosure.

In some examples, as shown in FIG. 6, a region where each first mesh sub-electrode 211 is located overlaps with a second electrode region C, and a region where each second mesh sub-electrode 212 is located overlaps with a second auxiliary region D.

In some examples, a density of cells of the first mesh sub-electrode 211 is less than a density of cells of the second mesh sub-electrode 212. The density of the cells of the first mesh sub-electrode 211 is a distribution density of the cells in the first mesh sub-electrode 211, and the density of the cells of the second mesh sub-electrode 212 is a distribution density of the cells in the second mesh sub-electrode 212.

By setting the density of the cells of the second mesh sub-electrode 212 to be greater than the density of the cells of the first mesh sub-electrode 211, a resistance of the second mesh sub-electrode 212 may be reduced, thereby reducing a resistance of the first mesh electrode 21.

In some embodiments, as shown in FIG. 5, the second electrode layer 4 includes a second mesh electrode 41 disposed in each second electrode region C. The second mesh electrode 41 includes a plurality of third mesh sub-electrodes 411 and a plurality of fourth mesh sub-electrodes 412 that are alternately arranged in the second direction Y and are electrically connected in sequence. That is, one fourth mesh sub-electrode 412 is provided between any two adjacent third mesh sub-electrodes 411, one third mesh sub-electrode 411 is provided between any two adjacent fourth mesh sub-electrodes 412, and a third mesh sub-electrode 411 and a fourth mesh sub-electrode 412 that are adjacent are directly electrically connected.

In some examples, as shown in FIG. 6, a region where each third mesh sub-electrode 411 is located overlaps with a first electrode region A, and a region where each fourth mesh sub-electrode 412 is located overlaps with a first auxiliary region B.

In some examples, a density of cells of the third mesh sub-electrode 411 is less than a density of cells of the fourth mesh sub-electrode 412. The density of the cells of the third mesh sub-electrode 411 is a distribution density of the cells in the third mesh sub-electrode 411, and the density of the cells of the fourth mesh sub-electrode 412 is a distribution density of the cells in the fourth mesh sub-electrode 412.

By setting the density of the cells of the fourth mesh sub-electrode 412 to be greater than the density of the cells of the third mesh sub-electrode 411, a resistance of the fourth mesh sub-electrode 412 may be reduced, thereby reducing a resistance of the second mesh electrode 41.

In addition, since the region where the first mesh sub-electrode 211 with a small cell density is located overlaps with the second electrode region C, the region where the third mesh sub-electrode 411 with a small cell density is located overlaps with the first electrode region A, the region where the second mesh sub-electrode 212 with a large cell density is located overlaps with the second auxiliary region D, and the region where the fourth mesh sub-electrode 412 with a large cell density is located overlaps with the first auxiliary region B, in a direction perpendicular to the base 1, an orthogonal projection of the first mesh sub-electrode 211 on the base 1 overlaps with an orthogonal projection of the third mesh sub-electrode 411 on the base 1. In this case, it is beneficial to reduce a cell density difference of an orthogonal projection of a combination of the first electrode layer 2 and the second electrode layer 4 on the base 1, so that the touch substrate 100 has a good shadow elimination effect.

Therefore, for the touch substrate 100 provided in some embodiments of the present disclosure, by dividing the first mesh electrode 21 included in the first electrode layer 2 into the plurality of first mesh sub-electrodes 211 and the plurality of second mesh sub-electrodes 212 that are alternately arranged in the first direction X and are electrically connected in sequence, dividing the second mesh electrode 41 included in the second electrode layer 4 into the plurality of third mesh sub-electrodes 411 and the plurality of fourth mesh sub-electrodes 412 that are alternately arranged in the second direction Y and are electrically connected in sequence, setting the density of the cells of the second mesh sub-electrode 212 to be greater than the density of the cells of the first mesh sub-electrode 211, and setting the density of the cells of the fourth mesh sub-electrode 412 to be greater than the density of the cells of the third mesh sub-electrode 411, the resistance of the first mesh electrode 21 and the resistance of the second mesh electrode 41 may be effectively reduced. In this case, it is beneficial to improve touch sensitivity of the touch substrate 100.

In addition, by setting positional relationships between the first mesh sub-electrode 211, the second mesh sub-electrode 212, the third mesh sub-electrode 411, and the fourth mesh sub-electrode 412, the cell density difference of the orthogonal projection of the combination of the first electrode layer 2 and the second electrode layer 4 on the base 1 may be reduced, so that the touch substrate 100 has a good shadow elimination effect.

Figure 7:
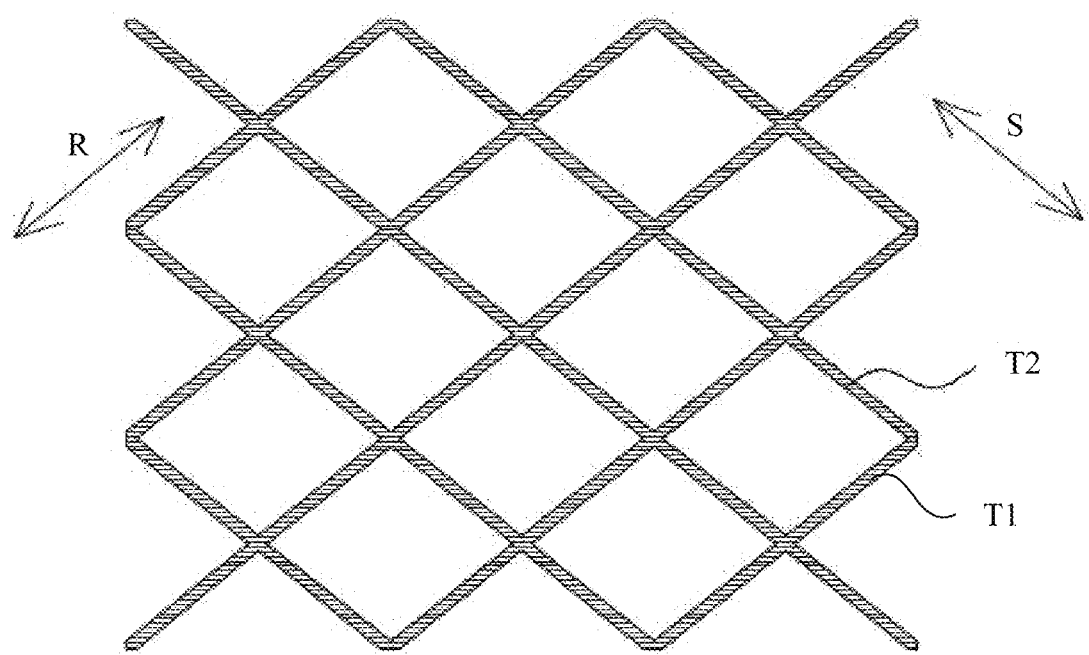
FIG. 7 is a structural diagram of a mesh electrode, in accordance with some embodiments of the present disclosure.

In some embodiments, as shown in FIG. 7, in mesh electrodes included in the first electrode layer 2 and mesh electrodes included in the second electrode layer 4, any mesh electrode may include a plurality of first electrode lines T1 extending in a third direction R, and a plurality of second electrode lines T2 extending in a fourth direction S. The third direction R intersects the fourth direction S, so that the plurality of first electrode lines T1 and the plurality of second electrode lines T2 in a same electrode layer intersect with each other to form cells of the mesh electrode. Each cell of the mesh electrode is a region enclosed by two adjacent first electrode lines T1 and two adjacent second electrode lines T2, in which there is no electrode material.

In some examples, the density of the cells of the mesh electrode may be represented by distances between the plurality of first electrode lines T1 parallel to one another and distances between the plurality of second electrode lines T2 parallel to one another in the mesh electrode. The larger the distances between the first electrode lines T1 and between the second electrode lines T2 are, the smaller the density of the cells of the mesh electrode is. For example, in an embodiment of the present disclosure, in an extension plane of the mesh electrode, the density of the cells of the mesh electrode may be related to a distribution density of the first electrode lines T1 in a direction perpendicular to an extending direction of the first electrode lines T1, and a distribution density of the second electrode lines T2 in a direction perpendicular to an extending direction of the second electrode lines T2.

Of course, the density of the cells of the mesh electrode may also be represented by using other manners. For example, in an embodiment of the present disclosure, the density of the cells of the mesh electrode may be represented by a size of the cells of the mesh electrode. The larger the size of the cells is, the smaller the density of the cells of the mesh electrode is.

Herein, there are various shapes of the cell, which may be selectively set according to actual needs.

For example, the shape of the cell includes at least one of a rectangular shape, a square shape, and a rhombic shape.

Of course, the shape of the cell is not limited to the three shapes exemplified above.

In some examples, each mesh electrode described above may be a mesh electrode with the cells uniformly distributed. In a case where a mesh electrode is a mesh electrode with cells uniformly distributed, in the mesh electrode, a distance between any two adjacent first electrode lines T1 is the same or approximately the same, and a distance between any two adjacent second electrode lines T2 is the same or approximately the same.

Optionally, as shown in FIGS. 4 and 5, the first mesh sub-electrode 211, the second mesh sub-electrode 212, the third mesh sub-electrode 411, and the fourth mesh sub-electrode 412 each may be a mesh electrode with cells uniformly distributed, which may improve the optical shadow elimination effect of the touch substrate 100, and facilitate to design and form the first mesh sub-electrode 211, the second mesh sub-electrode 212, the third mesh sub-electrode 411, and the fourth mesh sub-electrode 412.

A structure of the touch substrate 100 provided in some embodiments of the present disclosure will be schematically described below with reference to the accompanying drawings.

In some embodiments, as shown in FIGS. 4 to 6, according to positional relationships between the first electrode regions A, the first auxiliary regions B, the second electrode regions C, and the second auxiliary regions D, the touch substrate 100 may have at least a plurality of types of regions, such as first regions E, second regions F, third regions G, and fourth regions H.

Herein, as shown in FIGS. 4 to 6, the first region E is a region where the first electrode region A and the second electrode region C overlap each other, i.e., a region where the first mesh electrode 21 and the second mesh electrode 41 overlap each other. In other words, a range where an orthogonal projection of the first mesh electrode 21 in the first electrode region A on the base 1 and an orthogonal projection of the second mesh electrode 41 in the second electrode region C on the base 1 overlap coincides with the first region E. In the first region E, a touch capacitor is formed between the first mesh electrode 21 and the second mesh electrode 41, and the touch capacitor may be used as a touch sensor for the touch substrate 100 to achieve touch detection.

The second region F is a region where the first electrode region A and the second auxiliary region D overlap each other. In other words, a range in which the first electrode region A and the second auxiliary region D overlap coincides with the second region F.

The third region G is a region where the second electrode region C and the first auxiliary region B overlap each other. In other words, a range in which the second electrode region C and the first auxiliary region B overlap coincides with the third region G.

The fourth region H is a region where the first auxiliary region B and the second auxiliary region D overlap each other. In other words, a range where an orthogonal projection of a portion of the first electrode layer 2 in the first auxiliary region B on the base 1 and an orthogonal projection of a portion of the second electrode layer 4 in the second auxiliary region D on the base 1 overlap coincides with the fourth region H.

In this case, as shown in FIGS. 4 and 6, in the first electrode layer 2, the first mesh sub-electrode 211 is disposed in the first region E, and the second mesh sub-electrode 212 is disposed in the second region F. As shown in FIGS. 5 and 6, in the second electrode layer 4, the third mesh sub-electrode 411 is disposed in the first region E, and the fourth mesh sub-electrode 412 is disposed in the third region G. A touch capacitor is formed between the first mesh sub-electrode 211 and the third mesh sub-electrode 411 that are both located in the first region E.

In some embodiments, a ratio of the density of the cells of the first mesh sub-electrode 211 to the density of the cells of the second mesh sub-electrode 212 is 1:2 or approximately 1:2.

In this case, as shown in FIG. 4, a ratio of the distance q1 between two adjacent first electrode lines T1 in the first mesh sub-electrode 211 to the distance m1 between two adjacent first electrode lines T1 in the second mesh sub-electrode 212 is 2:1 or approximately 2:1. A ratio of the distance r1 between two adjacent second electrode lines T2 in the first mesh sub-electrode 211 to the distance n1 between two adjacent second electrode lines T2 in the second mesh sub-electrode 212 is 2:1 or approximately 2:1.

In this way, the resistance of the second mesh sub-electrode 212 may be effectively reduced, and thus the resistance of the first mesh electrode 21 may be reduced.

In some embodiments, a ratio of the density of the cells of the third mesh sub-electrode 411 to the density of the cells of the fourth mesh sub-electrode 412 is 1:2 or approximately 1:2.

In this case, as shown in FIG. 5, a ratio of the distance q2 between two adjacent first electrode lines T1 in the third mesh sub-electrode 411 to the distance m2 between two adjacent first electrode lines T1 in the fourth mesh sub-electrode 412 is 2:1 or approximately 2:1. A ratio of the distance r2 between two adjacent second electrode lines T2 in the third mesh sub-electrode 411 to the distance n2 between two adjacent second electrode lines T2 in the fourth mesh sub-electrode 412 is 2:1 or approximately 2:1.

In this way, the resistance of the fourth mesh sub-electrode 412 may be effectively reduced, and thus the resistance of the second mesh electrode 41 may be reduced.

In some examples, the density of the cells of the first mesh sub-electrode 211 is the same or substantially the same as the density of the cells of the third mesh sub-electrode 411.

In this case, the distance between two adjacent first electrode lines T1 in the first mesh sub-electrode 211 is the same or substantially the same as the distance between two adjacent first electrode lines T1 in the third mesh sub-electrode 411. The distance between two adjacent second electrode lines T2 in the first mesh sub-electrode 211 is the same or substantially the same as the distance between two adjacent second electrode lines T2 in the third mesh sub-electrode 411.

In some examples, the density of the cells of the second mesh sub-electrode 212 is the same or substantially the same as the density of the cells of the fourth mesh sub-electrode 412.

In this case, the distance between two adjacent first electrode lines T1 in the second mesh sub-electrode 212 is the same or substantially the same as the distance between two adjacent first electrode lines T1 in the fourth mesh sub-electrode 412. The distance between two adjacent second electrode lines T2 in the second mesh sub-electrode 212 is the same or substantially the same as the distance between two adjacent second electrode lines T2 in the fourth mesh sub-electrode 412.

This means that a density of cells of an orthogonal projection of a combination of the first mesh sub-electrode 211 and the third mesh sub-electrode 411 on the base 1 may be the same or substantially the same as a density of cells of an orthogonal projection of the second mesh sub-electrode 212 on the base 1, and may also be the same or substantially the same as a density of cells of an orthogonal projection of the fourth mesh sub-electrode 412 on the base 1. In this case, it is beneficial to improve the shadow elimination effect of the touch substrate 100.

In some examples, as shown in FIG. 6, in the orthogonal projection of the combination of the first electrode layer 2 and the second electrode layer 4 on the base 1, a distance m3 between orthogonal projections of two adjacent first electrode lines T1 may be in a range from 100 μm to 400 μm, and a distance n3 between orthogonal projections of two adjacent second electrode lines T2 may be in a range from 100 μm to 400 μm.

For example, as shown in FIG. 6, in the first region E, in an orthogonal projection of a combination of the first mesh electrode 21 and the second mesh electrode 41 on the base 1, one of two adjacent first electrode lines T1 belongs to the first mesh electrode 21, and the other first electrode line T1 belongs to the second mesh electrode 41; and one of two adjacent second electrode lines T2 belongs to the first mesh electrode 21, and the other second electrode line T2 belongs to the second mesh electrode 41.

For example, the distance between the orthogonal projections of the two adjacent first electrode lines T1 may be 100 μm, 200 μm, 260 μm, 300 μm, or 400 μm, and the distance between the orthogonal projections of the two adjacent second electrode lines T2 may be 100 μm, 150 μm, 210 μm, 300 μm, or 400 μm.

Optionally, a line width of the first electrode line T1 is the same or substantially the same as a line width of the second electrode line T2. Herein, the line width of any electrode line may be a dimension of the electrode line in a direction parallel to a surface of the base 1 on which the first electrode layer 2 and the second electrode layer 3 are arranged and perpendicular to an extending direction of the electrode line.

By setting the line width of the first electrode line T1 and the line width of the second electrode line T2 to be the same or substantially the same, uniformity of electrode lines in the first electrode layer 2 and the second electrode layer 4 may be improved, and the optical shadow elimination effect of the touch substrate 100 may be improved.

In some examples, the line width of each first electrode line T1 is in a range from 3 μm to 10 μm, and the line width of each second electrode line T2 is in a range from 3 μm to 10 μm.

For example, the line width of each first electrode line T1 may be 3 μm, 4 μm, 5 μm, 7 μm, 9 μm, or 10 μm. The line width of each second electrode line T2 may be 3 μm, 4.5 μm, 5.6 μm, 7 μm, 8 μm, 9 μm, or 10 μm.

In some embodiments, as shown in FIGS. 5 and 6, in the second electrode layer 4, there is no mesh electrode in a region overlapping the region where the second mesh sub-electrode 212 is located in the second auxiliary region D. That is, a pattern of the second electrode layer 4 is not located in the second region F. In this way, it is possible to prevent a parasitic capacitor from being formed between the second mesh sub-electrode 212 and the second mesh electrode 41, thereby reducing an impedance of the second mesh sub-electrode 212, and reducing an impedance of the first mesh electrode 21. In this way, it is beneficial to improve the touch sensitivity of the touch substrate 100.

In some examples, in the second electrode layer 4, in the case where no mesh electrode is provided in the region overlapping the region where the second mesh sub-electrode 212 is located in the second auxiliary region D, the density of the cells of the orthogonal projection of the combination of the first mesh sub-electrode 211 and the third mesh sub-electrode 411 on the base 1 is the same or substantially the same as the density of the cells of the orthogonal projection of the second mesh sub-electrode 212 on the base 1.

That is, a density of cells of an orthogonal projection of a combination of mesh electrodes in the first region E on the base 1 is the same or substantially the same as a density of cells of an orthogonal projection of a mesh electrode in the second region F on the base 1, so that the combination of the mesh electrodes in the first region E and the mesh electrode in the second region F may be uniform, which is beneficial to improving the shadow elimination effect of the touch substrate 100.

It will be noted that, in this case, a pattern of the orthogonal projection of the combination of the first mesh sub-electrode 211 and the third mesh sub-electrode 411 on the base 1 may be the same as or different from a pattern of the orthogonal projection of the second mesh sub-electrode 212 on the base 1.

Optionally, as shown in FIG. 6, the pattern of the orthogonal projection of the combination of the first mesh sub-electrode 211 and the third mesh sub-electrode 411 on the base 1 is the same or substantially the same as the pattern of the orthogonal projection of the second mesh sub-electrode 212 on the base 1.

In this way, in the touch substrate 100 provided in some embodiments of the present disclosure, the pattern of the combination of the mesh electrodes in the first region E may be the same or substantially the same as the pattern of the mesh electrode in the second region F, thereby ensuring that a same or similar optical shadow elimination effect of the touch substrate 100 is obtained in the first region E and the second region F, and ensuring that a more uniform and excellent optical shadow elimination effect of an entire touch substrate 100 is obtained.

In some embodiments, as shown in FIGS. 4 and 6, in the first electrode layer 2, there is no mesh electrode in a region overlapping the region where the fourth mesh sub-electrode 412 is located in the first auxiliary region B. That is, a pattern of the first electrode layer 2 is not located in the third region G. In this way, it is possible to prevent a parasitic capacitor from being formed between the fourth mesh sub-electrode 412 and the first mesh electrode 21, thereby reducing an impedance of the fourth mesh sub-electrode 412, and reducing an impedance of the second mesh electrode 41. In this case, it is beneficial to improve the touch sensitivity of the touch substrate 100.

In some examples, in the case where no mesh electrode is provided in the region overlapping the region where the fourth mesh sub-electrode 412 is located in the first auxiliary region B, the density of the cells of the orthogonal projection of the combination of the first mesh sub-electrode 211 and the third mesh sub-electrode 411 on the base 1 is the same or substantially the same as the density of the cells of the orthogonal projection of the fourth mesh sub-electrode 412 on the base 1.

That is, the density of the cells of the orthogonal projection of the combination of the mesh electrodes in the first region E on the base 1 is the same or substantially the same as a density of cells of an orthogonal projection of a mesh electrode in the third region G on the base 1, so that the combination of the mesh electrodes in the first region E and the mesh electrode in the third region G may be uniform, which is beneficial to improving the shadow elimination effect of the touch substrate 100.

It will be noted that, in this case, the pattern of the orthogonal projection of the combination of the first mesh sub-electrode 211 and the third mesh sub-electrode 411 on the base 1 may be the same as or different from a pattern of the orthogonal projection of the fourth mesh sub-electrode 412 on the base 1.

Optionally, as shown in FIG. 6, the pattern of the orthogonal projection of the combination of the first mesh sub-electrode 211 and the third mesh sub-electrode 411 on the base 1 is the same as the pattern of the orthogonal projection of the fourth mesh sub-electrode 412 on the base 1.

In this way, in the touch substrate 100 provided in some embodiments of the present disclosure, the pattern of the combination of the mesh electrodes in the first region E may be the same or substantially the same as the pattern of the mesh electrode in the third region G, thereby ensuring that a same or similar optical shadow elimination effect is obtained in the first region E and the third region G of the touch substrate 100, and ensuring that a more uniform and excellent optical shadow elimination effect of the entire touch substrate 100 is obtained.

In an embodiment of the present disclosure, as shown in FIGS. 4 to 6, the ratio of the density of the cells of the first mesh sub-electrode 211 to the density of the cells of the second mesh sub-electrode 212 is 1:2 or approximately 1:2, and in the second electrode layer 4, no mesh electrode is provided in the region overlapping the region where the second mesh sub-electrode 212 is located in the second auxiliary region D; the ratio of the density of the cells of the third mesh sub-electrode 411 to the density of the cells of the fourth mesh sub-electrode 412 is 1:2 or approximately 1:2, and in the first electrode layer 2, no mesh electrode is provided in the region overlapping the region where the fourth mesh sub-electrode 412 is located in the first auxiliary region B; and the density of the cells of the first mesh sub-electrode 211 is the same or substantially the same as the density of the cells of the third mesh sub-electrode 411. In this way, in the orthogonal projection of the combination of the first electrode layer 2 and the second electrode layer 4 on the base 1, the density of the cells of the mesh sub-electrode in each region is the same or substantially the same, so that the touch substrate 100 provided in some embodiments of the present disclosure may achieve a good shadow elimination effect.

Optionally, the pattern of the orthogonal projection of the combination of the first mesh sub-electrode 211 and the third mesh sub-electrode 411 on the base 1 is the same as the pattern of the orthogonal projection of the second mesh sub-electrode 212 on the base 1, and is the same as the pattern of the orthogonal projection of the fourth mesh sub-electrode 412 on the base 1. In this way, in the touch substrate 100 provided in some embodiments of the present disclosure, the pattern of the combination of the mesh electrodes in the first region E, the pattern of the mesh electrode in the second region F, and the pattern of the mesh electrode in the third region G are the same, which avoids different requirements for the optical shadow elimination caused by a difference between the patterns of the mesh electrodes in the regions, and facilitates to perform an optical shadow elimination processing on the touch substrate 100 and achieve a better optical shadow elimination effect.

Herein, it will be noted that, the pattern of the mesh electrode in the touch substrate 100, or the pattern of the mesh electrode in the first region E, the second region F, the third region G or the fourth region H, refers to a pattern after orthogonal projections of mesh electrodes in the first electrode layer 2 and the second electrode layer 4 on the base 1 are superimposed. The pattern of the mesh electrode may be represented by a distribution density of first electrode lines T1 extending in the third direction R and a distribution density of second electrode lines T2 extending in the fourth direction S.

For example, a pattern of a mesh electrode may be represented by a distance parameters (i.e., v and w), where v is a distance between any two adjacent first electrode lines T1 of the mesh electrode, and w is a distance between any two adjacent second electrode lines T2 of the mesh electrode. If distance parameters of one mesh electrode are the same as distance parameters of another mesh electrode, patterns of the two mesh electrodes are the same.

In some examples, as shown in FIGS. 4 and 5, patterns of the first mesh sub-electrode 211 and the third mesh sub-electrode 411 may be the same, which may facilitate to design and form the first mesh sub-electrode 211 and the third mesh sub-electrode 411.

Optionally, a pattern of the second mesh sub-electrode 212 may be a superposition of patterns of two first mesh sub-electrodes 211 after being staggered. In this way, it is possible not only to ensure that the density of the cells of the second mesh sub-electrode 212 is twice that of the first mesh sub-electrode 211, but also to facilitate to design and form the second mesh sub-electrode 212. Not only that, if the first mesh sub-electrode 211 and the third mesh sub-electrode 411 overlap in a staggered manner in the first region E, it is possible to ensure that the pattern of the orthogonal projection of the combination of the first mesh sub-electrode 211 and the third mesh sub-electrode 411 on the base 1 is the same or substantially the same as the pattern of the orthogonal projection of the second mesh sub-electrode 212 on the base 1.

Optionally, a pattern of the fourth mesh sub-electrode 412 may be a superposition of patterns of two third mesh sub-electrodes 411 after being staggered. In this way, it is possible not only to ensure that the density of the cells of the fourth mesh sub-electrode 412 is twice that of the third mesh sub-electrode 411, but also to facilitate to design and form the fourth mesh sub-electrode 412. Not only that, if the first mesh sub-electrode 211 and the third mesh sub-electrode 411 overlap in a staggered manner in the first region E, it is possible to ensure that the pattern of the orthogonal projection of the combination of the first mesh sub-electrode 211 and the third mesh sub-electrode 411 on the base 1 is the same or substantially the same as the pattern of the orthogonal projection of the fourth mesh sub-electrode 412 on the base 1.

It will be noted that, that two mesh electrodes overlap in a staggered manner means that electrode lines extending in a same direction in the two mesh electrodes are parallel to each other and do not overlap. For example, as shown in FIG. 6, in the first region E, the first mesh sub-electrode 211 and the third mesh sub-electrode 411 overlap in a staggered manner, and orthogonal projections of first electrode lines T1 extending in the third direction R in the first mesh sub-electrode 211 on the base 1 and orthogonal projections of first electrode lines T1 extending in the third direction R in the third mesh sub-electrode 411 on the base 1 are spaced apart from each other; and orthogonal projections of second electrode lines T2 extending in the fourth direction S in the first mesh sub-electrode 211 on the base 1 and orthogonal projections of second electrode lines T2 extending in the fourth direction S in the third mesh sub-electrode 411 on the base 1 are spaced apart from each other.

For example, in a case where two mesh electrodes are arranged in a staggered manner, a mesh electrode pattern formed by the two mesh electrodes in the touch substrate 100 may be a mesh electrode pattern with cells uniformly distributed. In other words, in a case where two mesh electrodes form a mesh electrode pattern with cells uniformly distributed in the touch substrate 100, in orthogonal projections of all first electrode lines T1 extending in the third direction R of the two mesh electrodes on the base 1, a distance between orthogonal projections of any two adjacent first electrode lines T1 is the same or substantially the same, and in orthogonal projections of all second electrode lines T2 extending in the fourth direction S of the two mesh electrodes on the base 1, a distance between orthogonal projections of any two adjacent second electrode lines T2 is the same or substantially the same. In this way, it is possible to ensure uniformity of an overall pattern formed by the two mesh electrodes arranged in a staggered manner, and improve the optical shadow elimination effect of the touch substrate 100.

The touch substrate 100 provided in some embodiments of the present disclosure may further be provided with a mesh electrode in the fourth region H, so as to further improve the optical shadow elimination effect of the touch substrate 100 in different regions. Herein, there may be various manners of providing the mesh electrode provided in the fourth region H, which may be selectively set according to actual needs.

In an embodiment of the present disclosure, as shown in FIGS. 4 and 5, the first auxiliary region B includes first auxiliary sub-regions B1 overlapping the second auxiliary regions D and third auxiliary sub-regions B2 overlapping the second electrode regions C. The first auxiliary sub-regions B1 and the third auxiliary sub-regions B2 are alternately arranged in sequence. The second auxiliary region D includes second auxiliary sub-regions D1 overlapping the first auxiliary regions B and fourth auxiliary sub-regions D2 overlapping the first electrode regions A. The second auxiliary sub-regions D1 and the fourth auxiliary sub-regions D2 are alternately arranged in sequence.

The first auxiliary sub-region B1 and the second auxiliary sub-region D1 both coincide with the fourth region H, the third auxiliary sub-region B2 coincides with the third region G, and the fourth auxiliary sub-region D2 coincides with the second region F.

In some examples, as shown in FIG. 4, the first electrode layer 2 further includes third mesh electrodes 22 disposed in the first auxiliary sub-regions B1, and the third mesh electrode 22 is electrically insulated from the first mesh electrode 21. That is, no connection is formed between the third mesh electrode 22 and the first mesh electrode 21.

In some examples, as shown in FIG. 5, the second electrode layer 4 further includes fourth mesh electrodes 42 disposed in the second auxiliary sub-regions D1, and the fourth mesh electrode 42 is electrically insulated from the second mesh electrode 41. That is, no connection is formed between the fourth mesh electrode 42 and the second mesh electrode 41.

The density of the cells of the orthogonal projection of the combination of the first mesh sub-electrode 211 and the third mesh sub-electrode 411 on the base 1 is the same or substantially the same as a density of cells of an orthogonal projection of a combination of the third mesh electrode 22 and the fourth mesh electrode 42 on the base 1.

In this way, it is beneficial to improve uniformity of cell distribution densities of the mesh electrodes in different regions, and improve the optical shadow elimination effect of the touch substrate 100.

For example, as shown in FIG. 6, the pattern of the orthogonal projection of the combination of the first mesh sub-electrode 211 and the third mesh sub-electrode 411 on the base 1 is the same as a pattern of the orthogonal projection of the combination of the third mesh electrode 22 and the fourth mesh electrode 42 on the base 1.

In this way, it is ensured that a same optical shadow elimination effect of the touch substrate 100 is obtained in the first region E and the fourth region H. Therefore, based on that the first region E, the second region F, the third region G and the fourth region H have a same pattern, the four regions may have the same optical shadow elimination effect, which may effectively improve the optical shadow elimination effect of the touch substrate 100.

Further, as shown in FIG. 6, a pattern of the third mesh electrode 22 is the same as the pattern of the first mesh sub-electrode 211; and a pattern of the fourth mesh electrode 42 is the same as the pattern of the third mesh sub-electrode 411. In this way, it is possible to facilitate to design and form the first mesh sub-electrode 211, the third mesh sub-electrode 411, the third mesh electrode 22, and the fourth mesh electrode 42.

Optionally, as shown in FIG. 6, the pattern of the third mesh electrode 22 and the pattern of the fourth mesh electrode 42 are arranged in a staggered manner and do not coincide with each other, and the pattern of the first mesh sub-electrode 211 and the pattern of the third mesh sub-electrode 411 are arranged in a staggered manner and do not coincide with each other. In this way, it is possible not only to make the pattern of the orthogonal projection of the combination of the third mesh electrode 22 and the fourth mesh electrode 42 on the base 1 the same or substantially the same as the pattern of the orthogonal projection of the combination of the first mesh sub-electrode 211 and the third mesh sub-electrode 411 on the base 1, but also to prevent a large parasitic capacitance from being formed between the first mesh sub-electrode 211 and the third mesh sub-electrode 411, and prevent a large parasitic capacitance from being formed between the third mesh electrode 22 and the fourth mesh electrode 42.

In another embodiment of the present disclosure, as shown in FIGS. 8 to 11, the first auxiliary region B includes first auxiliary sub-regions B1 overlapping the second auxiliary regions D and third auxiliary sub-regions B2 overlapping the second electrode regions C. The first auxiliary sub-regions B1 and the third auxiliary sub-regions B2 are alternately arranged in sequence. The second auxiliary region D includes second auxiliary sub-regions D1 overlapping the first auxiliary regions B and fourth auxiliary sub-regions D2 overlapping the first electrode regions A. The second auxiliary sub-regions D1 and the fourth auxiliary sub-regions D2 are alternately arranged in sequence.

The first auxiliary sub-region and the second auxiliary sub-region both coincide with the fourth region H, the third auxiliary sub-region coincides with the third region G, and the fourth auxiliary sub-region coincides with the second region F.

Figure 9:
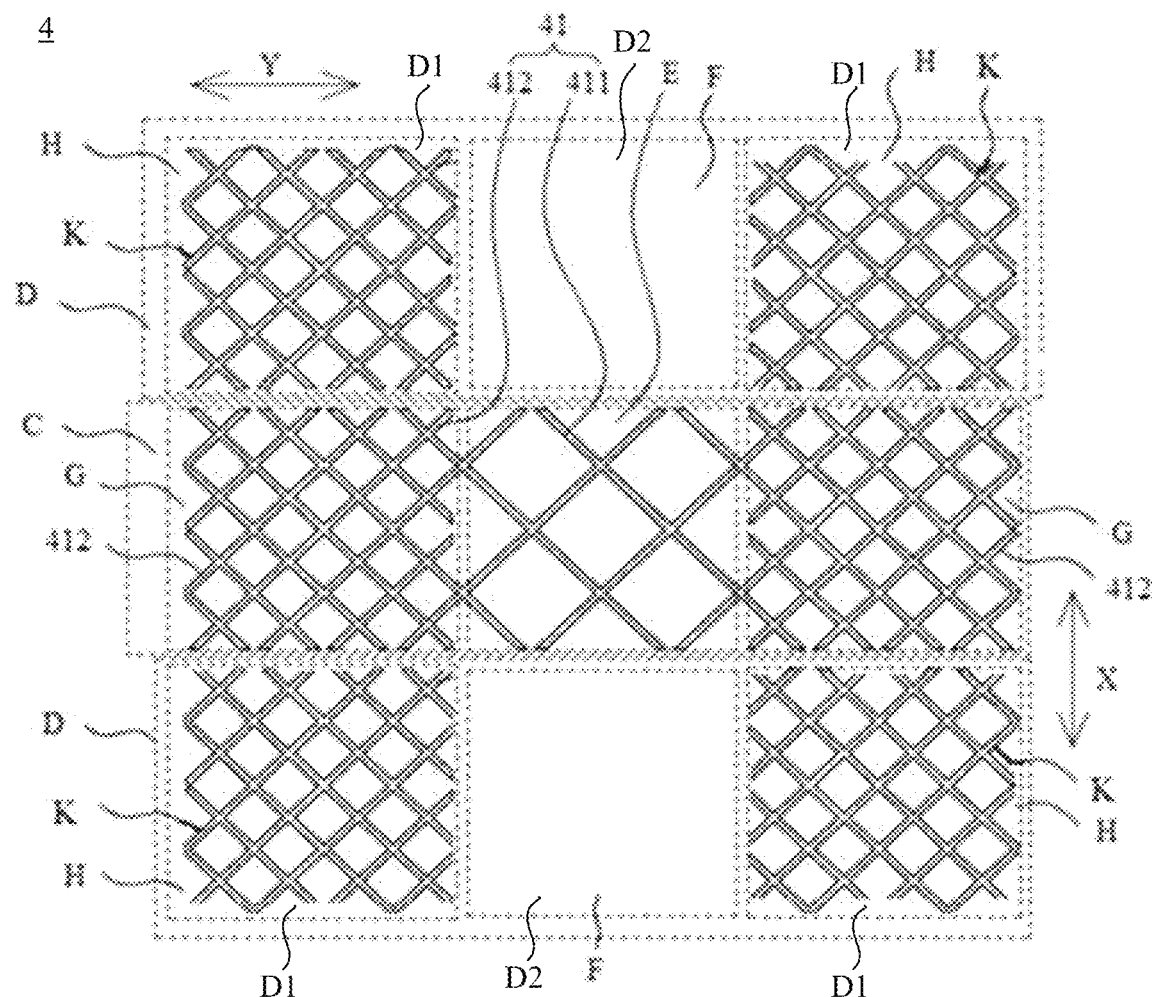
FIG. 9 is a structural diagram of a second electrode layer of the another touch substrate, in accordance with some embodiments of the present disclosure.
Figure 10:
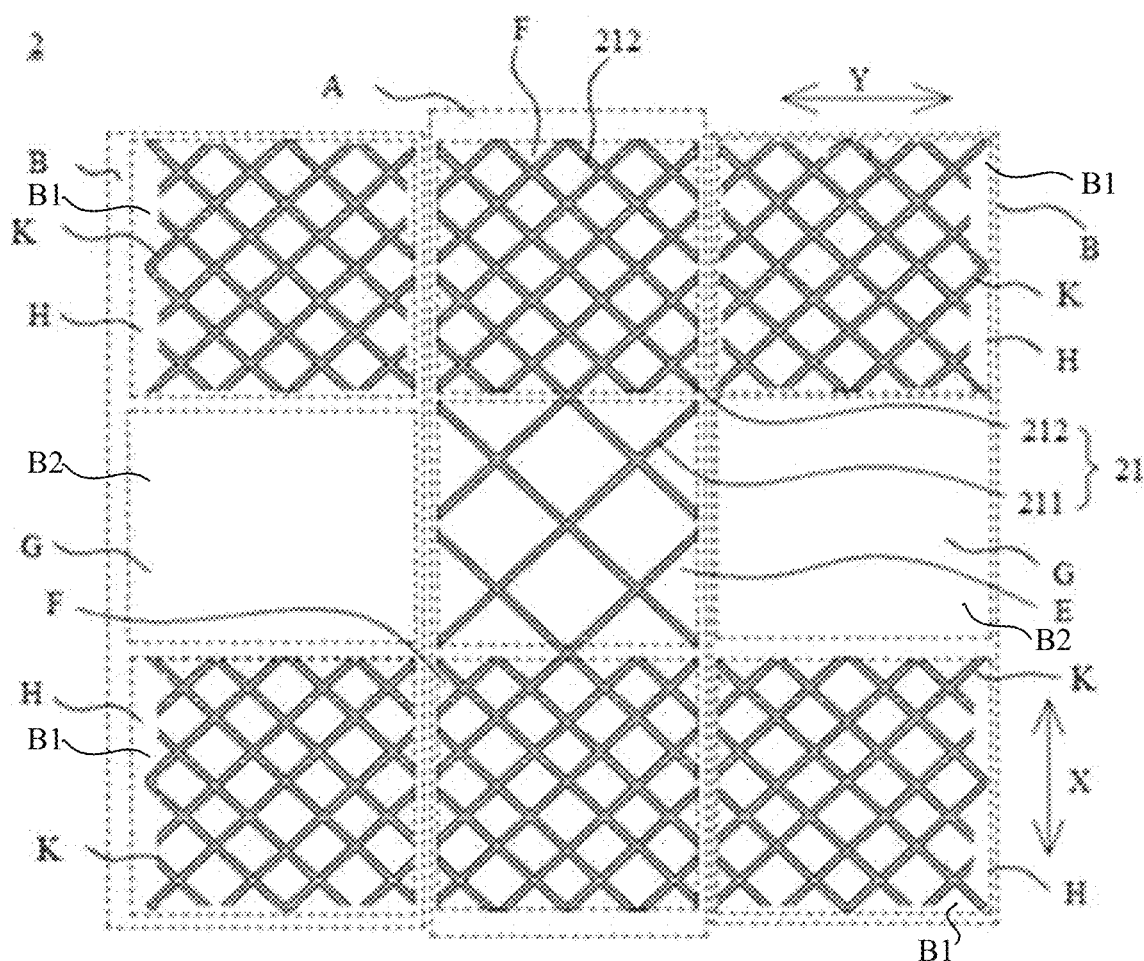
FIG. 10 is a structural diagram of a first electrode layer of yet another touch substrate, in accordance with some embodiments of the present disclosure.

In some examples, a fifth mesh electrode K is provided in the first auxiliary sub-region (as shown in FIG. 10) or the second auxiliary sub-region (as shown in FIG. 9). A density of cells of an orthogonal projection of the fifth mesh electrode K on the base 1 is the same or substantially the same as the density of the cells of the orthogonal projection of the combination of the first mesh sub-electrode 211 and the third mesh sub-electrode 411 on the base 1.

In this way, it is possible to ensure that the same optical shadow elimination effect of the touch substrate 100 is obtained in the first region E and the fourth region H. Therefore, based on that the first region E, the second region F, the third region G and the fourth region H have the same pattern, the four regions may have the same optical shadow elimination effect, which may effectively improve the optical shadow elimination effect of the touch substrate 100.

There may be various manners of providing the fifth mesh electrode K, which may be selectively set according to actual needs.

Figure 11:
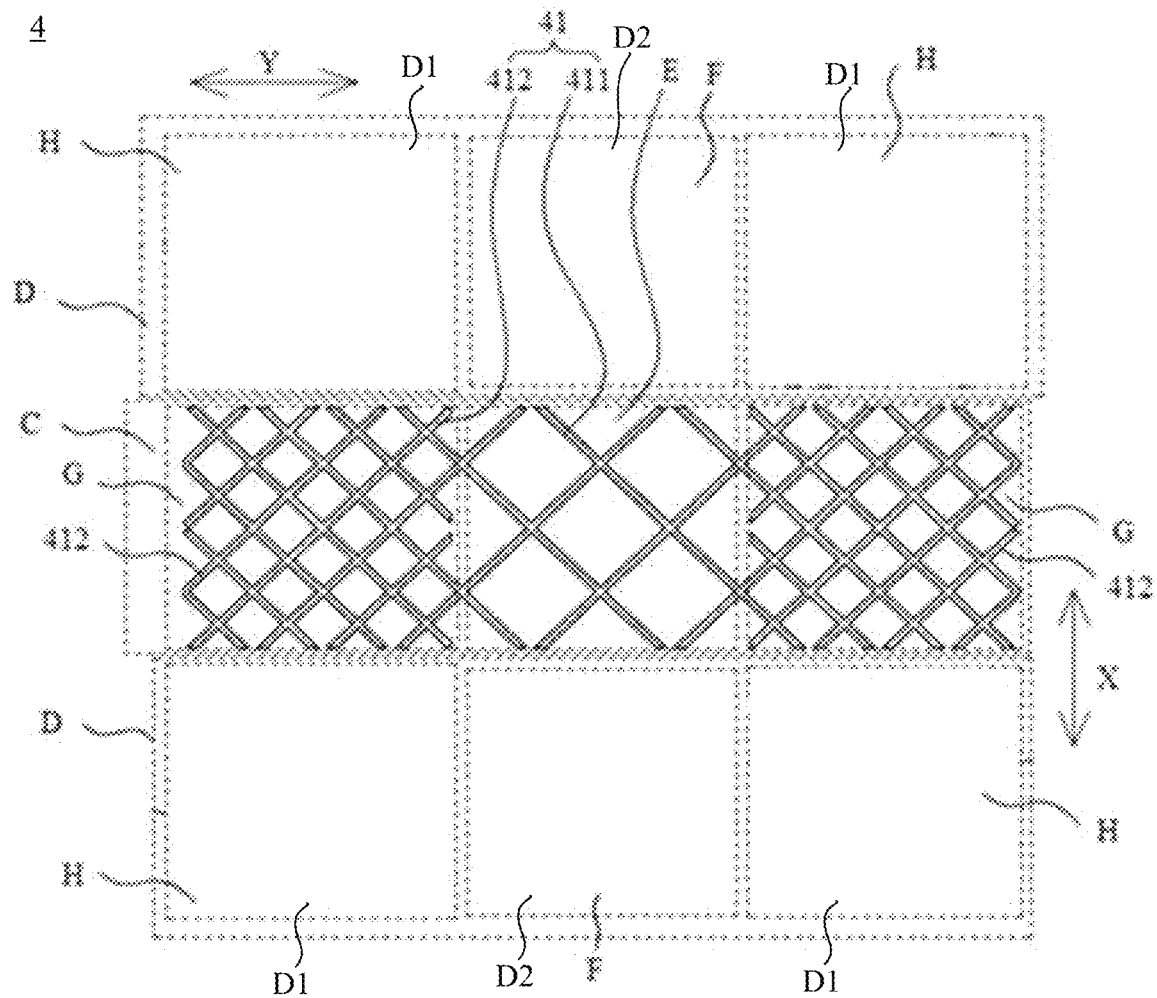
FIG. 11 is a structural diagram of a second electrode layer of the yet another touch substrate, in accordance with some embodiments of the present disclosure.

Optionally, as shown in FIGS. 10 and 11, in a case where the fifth mesh electrode K is provided in the first auxiliary sub-region, the fifth mesh electrode K is located in the first electrode layer 2, and the fifth mesh electrode K is electrically insulated from the first mesh electrode 21. That is, no connection is formed between the fifth mesh electrode K and the first mesh electrode 21. In this case, as shown in FIG. 11, in the second electrode layer 4, no mesh electrode is provided in the second auxiliary sub-region D1.

It will be noted that, that "A is located in a B layer" herein means that a pattern of the B layer includes a pattern of A. If the B layer further includes a pattern of C, the pattern of A and the pattern of C are arranged in a same layer. The "same layer" refers to a layer structure with specific patterns formed by performing a patterning process on a film by using a same mask after the film is formed by using a same film-forming process. Depending on different specific patterns, the patterning process may include multiple exposure, development or etching processes, and the specific patterns in the formed layer structure may be continuous or discontinuous, and these specific patterns may also be at different heights or have different thicknesses. In this way, by arranging patterns of a plurality of elements or components (e.g., the first mesh electrode 21 and the fifth mesh electrode K) in a same layer, without increasing the number of times of forming a film, manufacturing processes of the touch substrate 100 may be simplified.

Figure 8:
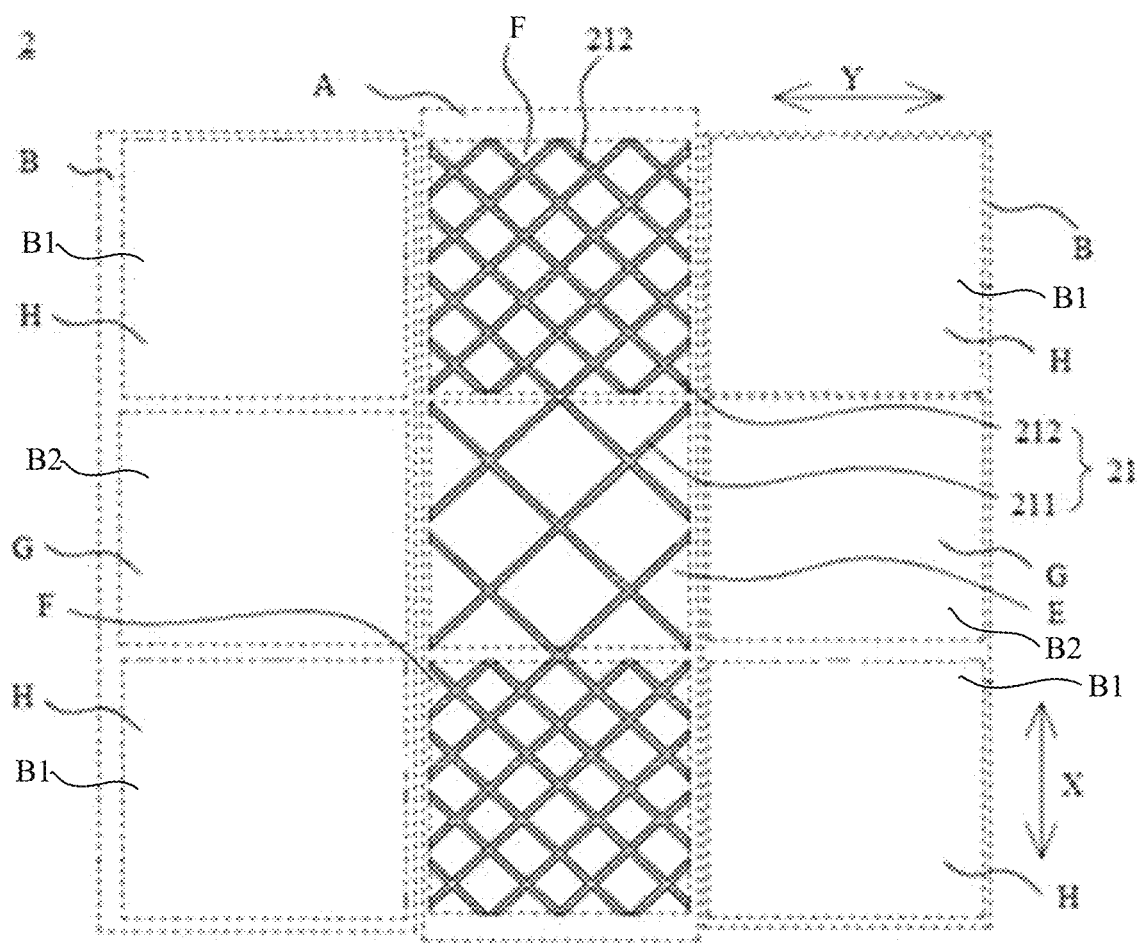
FIG. 8 is a structural diagram of a first electrode layer of another touch substrate, in accordance with some embodiments of the present disclosure.

Optionally, as shown in FIG. 9, in a case where the fifth mesh electrode K is provided in the second auxiliary sub-region D1, the fifth mesh electrode K is located in the second electrode layer 4, and the fifth mesh electrode K is electrically insulated from the second mesh electrode 41. That is, no connection is formed between the fifth mesh electrode K and the second mesh electrode 41. In this case, as shown in FIG. 8, in the first electrode layer 2, no mesh electrode is provided in the first auxiliary sub-region B1.

In this way, the fifth mesh electrode K and the second mesh electrode 41 may both be formed in one patterning process, which is beneficial to simplifying the manufacturing processes of the touch substrate 100.

Hereinafter, a structure, principle, and effect of the touch substrate 100 provided in some embodiments of the present disclosure will be schematically described by taking another implementation as an example.

Figure 3:
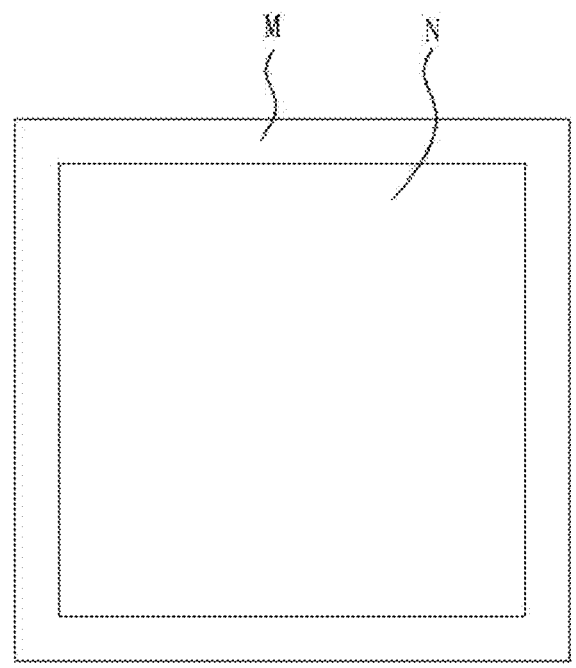
FIG. 3 is a structural diagram of yet another substrate touch substrate, in accordance with some embodiments of the present disclosure.

FIG. 3 is a top view of the touch substrate 100 in some examples of the present disclosure. It can be seen from FIG. 3 that, the touch substrate 100 in some examples of the present disclosure may have a touch region N and a peripheral region M surrounding the touch region N. Referring to FIGS. 4 and 5, the first electrode layer 2 has a plurality of first electrode regions A and a plurality of first auxiliary regions B that extend in the first direction X and are alternately arranged in sequence in the second direction Y, and the second electrode layer 4 has a plurality of second electrode regions C and a plurality of second auxiliary regions D that extend in the second direction Y and are alternately arranged in sequence in the first direction X. The first direction X intersects the second direction Y.

Herein, for description of the first electrode regions A, the first auxiliary regions B, the second electrode regions C, the second auxiliary regions D, the first direction X and the second direction Y, reference may be made to the description in the embodiments described above, and details will not be repeated herein.

In some examples, it can be seen from FIG. 2 that, the touch substrate 100 in some examples of the present disclosure may include the base 1, and a black matrix layer 5, the first electrode layer 2, the dielectric layer 3 and the second electrode layer 4 that are stacked in sequence on the base 1.

Herein, for the structure of the base 1, reference may be made to the description in the embodiments described above, and details will not be repeated herein.

In some examples, as shown in FIG. 2, the black matrix layer 5 is located in the peripheral region M.

In some examples, as shown in FIG. 2, an insulating layer 6 is provided between the black matrix layer 5 and the first electrode layer 2. The insulating layer 6 covers the black matrix layer 5, and a surface of the insulating layer 6 away from the base 1 is a flat surface, so that a structure of the first electrode layer 2 disposed on the surface of the insulating layer 6 away from the base 1 is flat, and structures of the mesh electrodes in the first electrode layer 2 are prevented from being broken.

For example, the insulating layer 6 may be made of an organic insulating material. The insulating layer 6 has a high light transmittance, so as to ensure that light from a side of the base 1 passes through the base, the insulating layer 6, the first electrode layer 2, the dielectric layer 3 and the second electrode layer 4 in sequence, and then exits.

In some examples, as shown in FIGS. 2 and 4, the first electrode layer 2 includes the first mesh electrode 21 disposed in each first electrode region A, and a plurality of first touch leads L1 disposed in the peripheral region M. The plurality of first touch leads L1 are connected to first mesh electrodes 21 in the plurality of first electrode regions A. For example, the first touch leads L1 are connected to the first mesh electrodes 21 in one-to-one correspondence.

In some examples, as shown in FIGS. 2 and 5, the second electrode layer 4 includes the second mesh electrode 41 disposed in each second electrode region C, and a plurality of second touch leads L2 disposed in the peripheral region M. The plurality of second touch leads L2 are connected to second mesh electrodes 41 in the plurality of second electrode regions A. For example, the second touch leads L2 are connected to the second mesh electrodes 41 in one-to-one correspondence.

For example, the first touch lead L1 is capable of transmitting a touch sensing signal to the first mesh electrode 21, and the second touch lead L2 is capable of transmitting a touch driving signal to the second mesh electrodes 41. By matching the touch sensing signal with the touch driving signal, touch control is achieved by using the first mesh electrode 21 and the second mesh electrodes 41.

In some examples, as shown in FIGS. 4 and 6, each first mesh electrode 21 includes the plurality of first mesh sub-electrodes 211 and the plurality of second mesh sub-electrodes that are alternately arranged in the first direction X and are electrically connected in sequence. Each first mesh sub-electrode 211 (located in the first region E) overlaps a second electrode region C, and each second mesh sub-electrode 212 (located in the second region F) overlaps a second auxiliary region D. As shown in FIGS. 5 and 6, each second mesh electrode 41 includes the plurality of third mesh sub-electrodes 411 and the plurality of fourth mesh sub-electrodes 412 that are alternately arranged in the second direction Y and are electrically connected in sequence. Each third mesh sub-electrode 411 (located in the first region E) overlaps a first electrode region A, and each fourth mesh sub-electrode 412 (located in the third region G) overlaps a first auxiliary region B.

In some examples, as shown in FIGS. 4 and 6, in the first electrode layer 2, no mesh electrode is provided in the region overlapping the region where the fourth mesh sub-electrode 412 is located in the first auxiliary region B (i.e., the third region G), and the region overlapping the second auxiliary region D in the first auxiliary region B (i.e., the fourth region H) is provided with the third mesh electrode 22 that belongs to the first electrode layer 2, and the third mesh electrode 22 is electrically insulated from the first mesh electrode 21. As shown in FIGS. 5 and 6, in the second layer 4, no mesh electrode is provided in the region overlapping the region where the second mesh sub-electrode 212 is located in the second auxiliary region D (i.e., the second region F), and the region overlapping the first auxiliary region B in the second auxiliary region D (i.e., the fourth region H) is provided with the fourth mesh electrode 42 that belongs to the second electrode layer 4, and the fourth mesh electrode 42 is electrically insulated from the second mesh electrode 41.

In some examples, the density of the cells of the first mesh sub-electrode 211, the density of the cells of the third mesh sub-electrode 411, the density of the cells of the third mesh electrode 22 and the density of the cells of the fourth mesh electrode 42 are the same or substantially the same, and the density of the cells of the second mesh sub-electrode 212 and the density of the cells of the fourth mesh sub-electrode 412 are the same or substantially the same. the density of the cells of the orthogonal projection of the combination of the first mesh sub-electrode 211 and the third mesh sub-electrode 411 on the base 1, the density of the cells of the orthogonal projection of the combination of the third mesh electrode 22 and the fourth mesh electrode 42 on the base 1, the density of the cells of the orthogonal projection of the second mesh sub-electrode 212 on the base 1, and the density of the cells of the orthogonal projection of the fourth mesh sub-electrode 412 on the base 1 are the same or substantially the same.

For example, as shown in FIGS. 4 to 6, the patterns of the first mesh sub-electrode 211, the third mesh sub-electrode 411, the third mesh electrode 22 and the fourth mesh electrode 42 are the same or substantially the same, and the patterns of the second mesh sub-electrode 212 and the fourth mesh sub-electrode 412 are the same or substantially the same. The pattern of the orthogonal projection of the combination of the first mesh sub-electrode 211 and the third mesh sub-electrode 411 on the base 1, the pattern of the orthogonal projection of the combination of the third mesh electrode 22 and the fourth mesh electrode 42 on the base 1, the pattern of the orthogonal projection of the second mesh sub-electrode 212 on the base 1 and the pattern of the orthogonal projection of the fourth mesh sub-electrode 412 on the base 1 are the same or substantially the same.

This means that the cell densities of the mesh electrodes in the first region E, the second region F, the third region G and the fourth region H are the same or substantially the same, and the patterns of the mesh electrodes in the first region E, the second region F, the third region G and the fourth region H are the same or substantially the same. In this way, it is beneficial to achieve a good optical shadow elimination effect of the touch substrate 100. Moreover, during operation of the touch substrate 100, electrical signals are transmitted only in the first mesh electrodes 21 and the second mesh electrodes 41, and the third mesh electrodes 21 electrically insulated from the first mesh electrodes 22 and the fourth mesh electrodes 42 electrically insulated from the second mesh electrodes 41 are in a floating state. That is, the electrical signals are transmitted only in the first region E, the second region F and the third region G, so that parasitic capacitors can be prevented from being formed between the first mesh electrodes 21 and the second mesh electrodes 41. Therefore, the impedances of the first mesh electrodes 21 and the second mesh electrodes 41 are reduced, the touch sensitivity of the touch substrate 100 is improved.

Optionally, as shown in FIGS. 4 and 5, the first mesh sub-electrode 211, the third mesh sub-electrode 411, the third mesh electrode 22, the fourth mesh electrode 42, and the second mesh sub-electrode 212 and the fourth mesh sub-electrode 412 each are the mesh electrode with the cells uniformly distributed.

As shown in FIG. 6, in the first region E of the touch substrate 100, the first mesh sub-electrode 211 and the third mesh sub-electrode 411 overlap in a staggered manner, so that the pattern of the combination of the mesh electrodes in the first region E may be a uniform mesh electrode pattern. In the fourth region H of the touch substrate 100, the third mesh electrode 22 and the fourth mesh electrode 42 overlap in a staggered manner, so that the pattern of the combination of the mesh electrodes in the fourth region H may be a uniform mesh electrode pattern. In this way, the pattern of the orthogonal projection of the combination of the first mesh sub-electrode 211 and the third mesh sub-electrode 411 on the base 1 is the same or substantially the same as, the pattern of the orthogonal projection of the combination of the third mesh electrode 22 and the fourth mesh electrode 42 on the base 1, the pattern of the orthogonal projection of the second mesh sub-electrode 212, and the pattern of the orthogonal projection of the fourth mesh sub-electrode 412 on the base 1.

In this way, it is beneficial to further ensure that the patterns of the mesh electrodes in the first region E, the second region F, the third region G and the fourth region H are the same or substantially the same, and further improve the optical shadow elimination effect of the touch substrate 100.

In some embodiments, as shown in FIG. 2, the touch substrate 100 in the examples may further include a protective layer 7 located on a side of the second electrode layer 4 away from the base 1. The protective layer 7 is capable of protecting the second electrode layer 4.

In order to further verify that the touch substrate 100 of the embodiments of the present disclosure can reduce the impedances of the mesh electrodes, some embodiments of the present disclosure further provide a first touch device and a second touch device as follows, and for specific structures, reference may be made to the following schematic descriptions.

Figure 12:
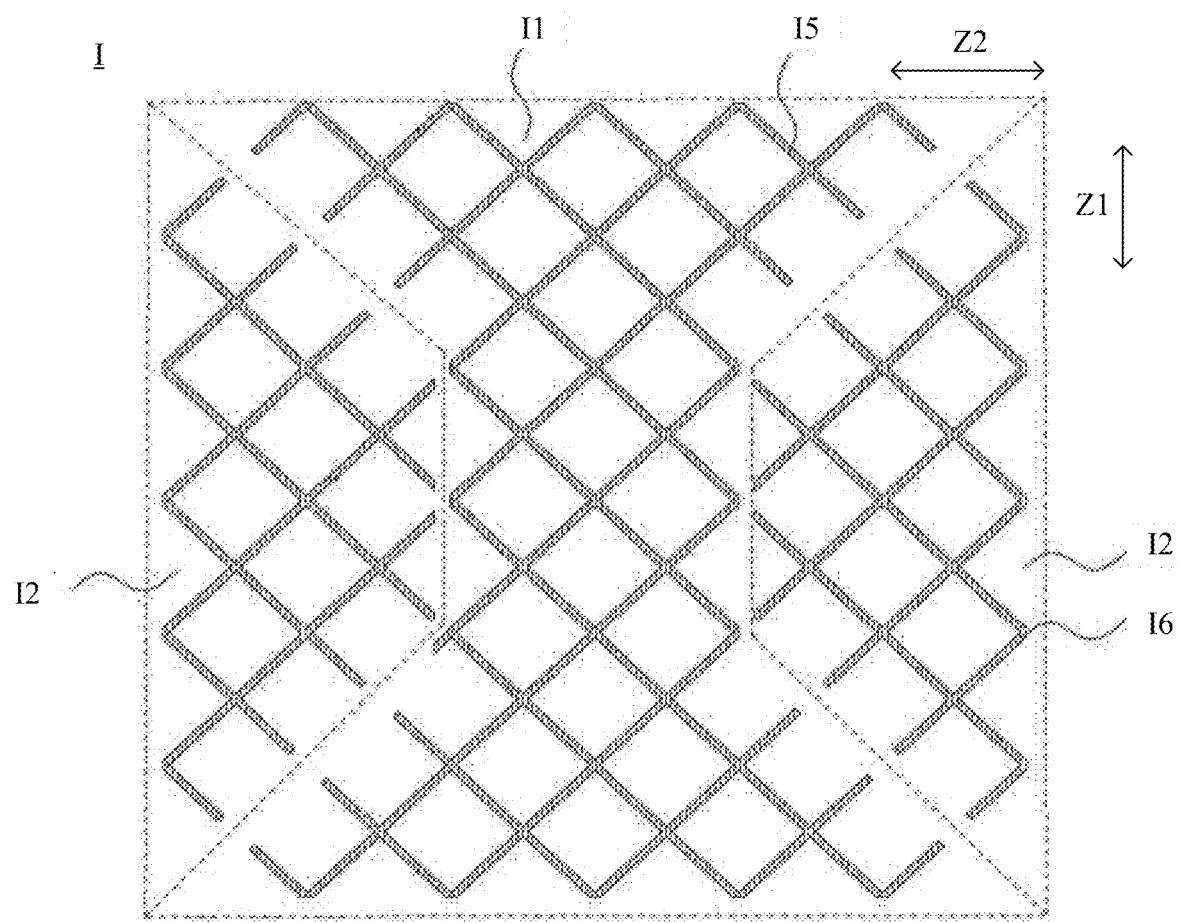
FIG. 12 is a structural diagram of a third electrode layer of a first touch device, in accordance with some embodiments of the present disclosure.
Figure 13:
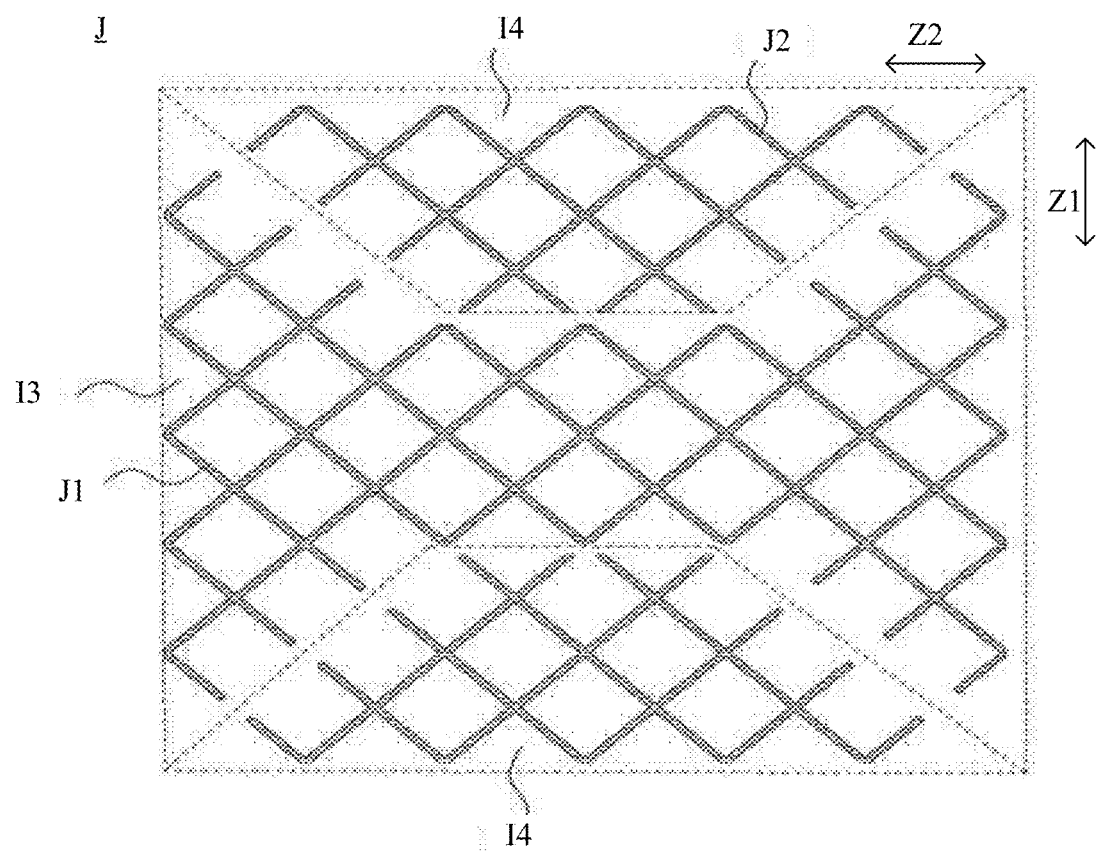
FIG. 13 is a structural diagram of a fourth electrode layer of the first touch device, in accordance with some embodiments of the present disclosure.

As shown in FIGS. 12 and 13, the first touch device includes a third electrode layer I and a fourth electrode layer J that are stacked in sequence.

As shown in FIGS. 12 and 13, the third electrode layer I has third electrode region I1(s) and third auxiliary regions I2, and the fourth electrode layer J has fourth electrode region(s) I3 and fourth auxiliary regions I4.

The third electrode layer I includes sixth mesh electrode (s) I5 disposed in the third electrode region(s) I1, and seventh mesh electrodes I6 disposed in the third auxiliary regions I2. The sixth mesh electrode I5 is electrically insulated from the seventh mesh electrode I6. The fourth electrode layer J includes eighth mesh electrode(s) J1 disposed in the fourth electrode region(s) I3, and ninth mesh electrodes J2 disposed in the fourth auxiliary regions I4. The eighth mesh electrode J1 is electrically insulated from the ninth mesh electrode J2. Patterns of the sixth mesh electrode I5, the seventh mesh electrode I6, the eighth mesh electrode J1 and the ninth mesh electrode J2 are the same.

For example, as shown in FIGS. 12 and 13, an extending direction Z1 of the third electrode region I1 and an extending direction Z2 of the fourth electrode region I3 are perpendicular to each other, so that a touch capacitor may be formed between the sixth mesh electrode I5 and the eighth mesh electrode J1 in an overlapping region.

Herein, the mesh electrodes in the third electrode layer I and the mesh electrodes in the fourth electrode layer J are disposed to overlap each other, so that a mesh electrode pattern of the first touch device is a uniform mesh electrode pattern. The first touch device may be used to simulate the metal mesh touch screen.

Figure 14:
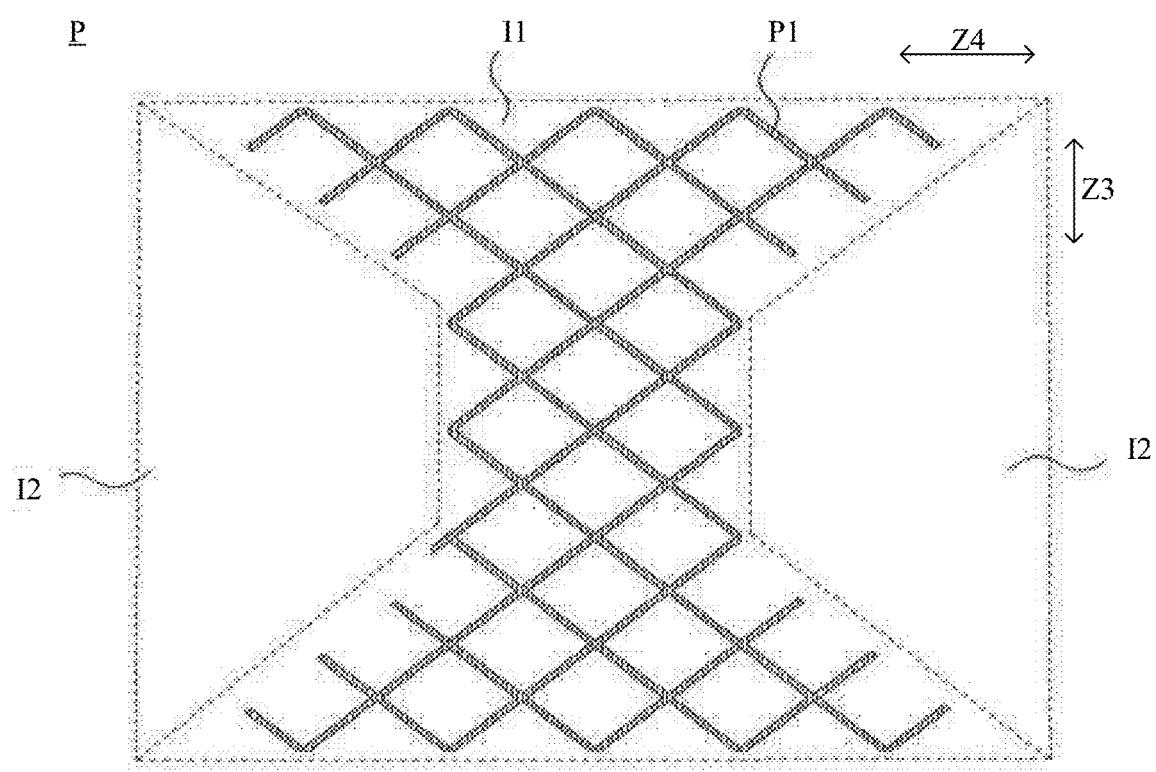
FIG. 14 is a structural diagram of a fifth electrode layer of a second touch device, in accordance with some embodiments of the present disclosure.
Figure 15:
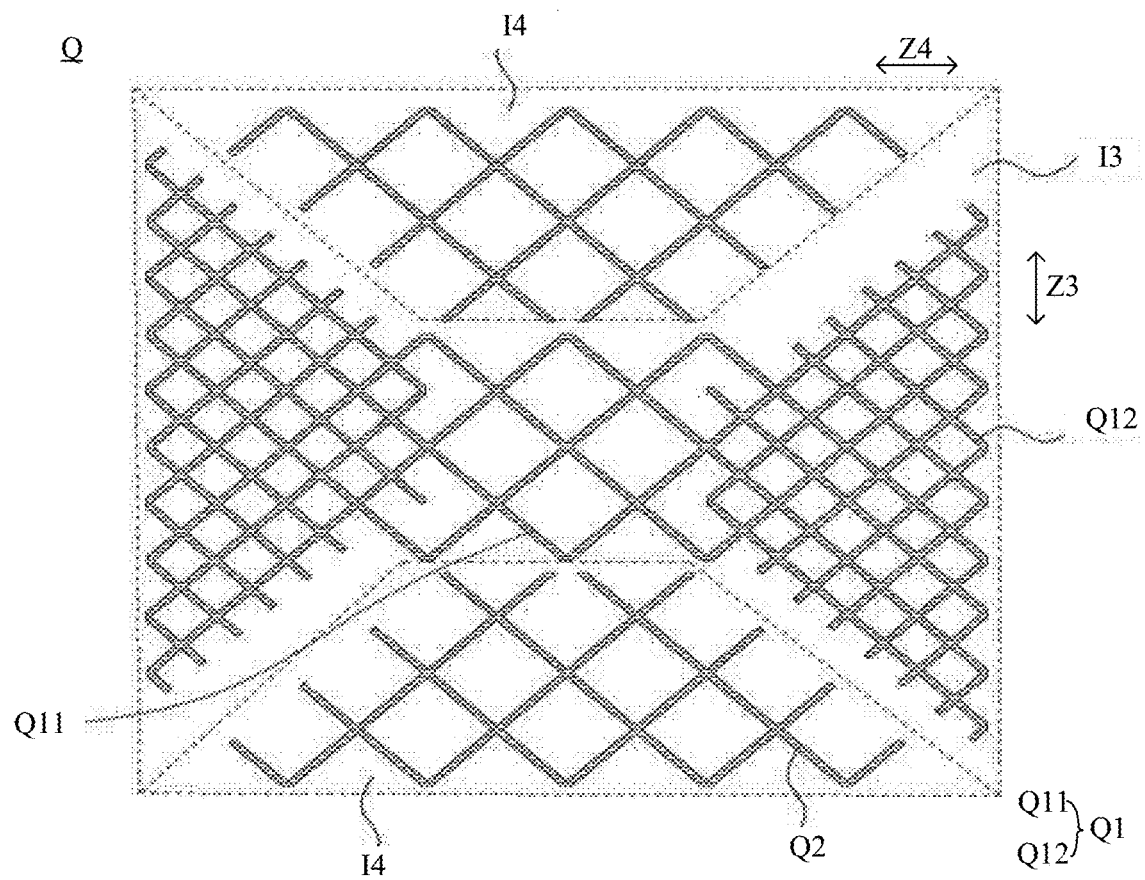
FIG. 15 is a structural diagram of a sixth electrode layer of the second touch device, in accordance with some embodiments of the present disclosure.

As shown in FIGS. 14 and 15, the second touch device includes a fifth electrode layer P and a sixth electrode layer Q.

As shown in FIGS. 14 and 15, the fifth electrode layer P has third electrode region(s) I1 and third auxiliary regions I2, and the sixth electrode layer Q has fourth electrode region(s) I3 and fourth auxiliary regions I4. An extending direction Z3 of the third electrode regions I1 is perpendicular to an extending direction Z4 of the fourth electrode regions I3.

The fifth electrode layer P includes tenth mesh electrode(s) P1 disposed in the third electrode region(s) I1, and in the fifth electrode layer P, no mesh electrode is provided in the third auxiliary region I2. The sixth electrode layer Q includes eleventh mesh electrode(s) Q1 disposed in the fourth electrode region(s) I3, and twelfth mesh electrodes Q2 disposed in the fourth auxiliary region(s). The eleventh mesh electrode Q1 is electrically insulated from the twelfth mesh electrode Q2. The eleventh mesh electrode Q1 includes an eleventh mesh sub-electrode Q11 overlapping the tenth mesh electrode P1 in the third electrode region I1, and a region where the twelfth mesh sub-electrode Q12 is located overlapping the third auxiliary region I2.

For example, patterns of the twelfth mesh electrode Q2, the tenth mesh electrode P1, the eleventh mesh sub-electrode Q11 and the sixth mesh electrode I5 are the same. A pattern of the twelfth mesh sub-electrode Q12 is the same as a mesh electrode pattern of the first touch device at a position where the seventh mesh electrode I6 and the eighth mesh electrode J1 overlap. The tenth mesh electrode P1, the eleventh mesh sub-electrode Q11 and the twelfth mesh electrode Q2 are disposed to overlap each other, so that a mesh electrode pattern of the second touch device is a uniform mesh electrode pattern. The second touch device is used to test the impedance of the second mesh electrode 41 of the touch substrate 100 provided in the embodiments of the present disclosure.

Test results of the eighth mesh electrode J1 of the first touch device and the eleventh mesh electrode Q1 of the second touch device are shown in Table 1.

TABLE 1 impedance test results

| Touch device | Resistance value of mesh electrode | Self-capacitance value of mesh electrode | Drive delay time |
| --- | --- | --- | --- |
| First touch device | 33.16 Ω | 2.16 pF | 0.137 ns |
| Second touch device | 23.07 Ω | 2.41 pF | 0.106 ns |

It can be seen from the Table 1 that, the resistance value of the eleventh mesh electrode Q1 of the second touch device is greatly reduced compared to the resistance value of the eighth mesh electrode J1 of the first touch device, and the drive delay is reduced by 22.6%, which effectively reduces the impedance of the eleventh mesh electrode Q1 of the second touch device. This means that the first mesh electrode 21 and the second mesh electrode 41 in the touch substrate 100 of the embodiments of the present disclosure adopt a design solution of varying cell densities, which may effectively reduce the impedances of the first mesh electrode 21 and the second mesh electrode, thereby facilitating to improve the touch sensitivity of the touch substrate 100.

Figure 16:
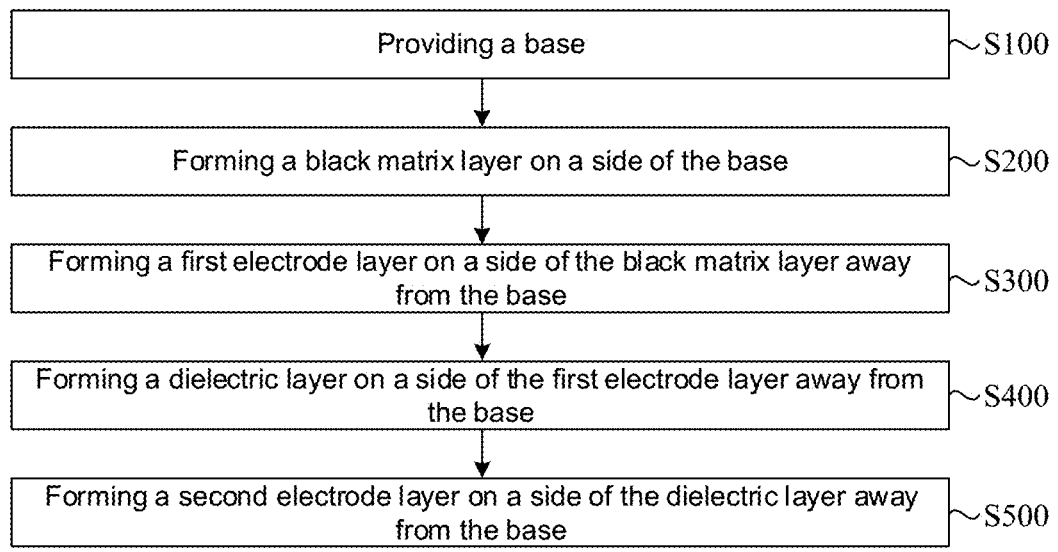
FIG. 16 is a flow diagram of a method of manufacturing a touch substrate, in accordance with some embodiments of the present disclosure.

Some embodiments of the present disclosure provide a method of manufacturing a touch substrate. As shown in FIG. 16, the manufacturing method includes S100 to S500.

In S100, referring to FIG. 2, a base 1 is provided.

In S200, referring to FIG. 2, a black matrix layer 5 is formed on a surface of the base 1.

For example, the black matrix layer 5 may be formed by using a photo-etching process.

In S300, referring to FIG. 2, a first electrode layer 2 is formed on a side of the black matrix layer 5 away from the base 1.

For example, in S300, the first electrode layer 2 may be formed by using the following method: a first electrode material layer is formed on the side of the black matrix layer 5 away from the base 1 by using a magnetron sputtering process; then a first photoresist layer is formed on a side of the first electrode material layer away from the base 1 by using a coating process; then the first photoresist layer is exposed and developed to obtain a patterned first photoresist layer; then the first electrode material layer is etched by using the patterned first photoresist layer as a mask; and then the patterned first photoresist layer is removed to obtain the first electrode layer 2.

In some examples, before S300, referring to FIG. 2, an insulating layer 6 is formed on a side of the black matrix layer 5 away from the base 1. The insulating layer 6 may be formed, for example, by using a photo-etching process.

In this case, the first electrode layer 2 is located on a surface of the insulating layer 6 away from the base 1. In this way, a space may be formed between the black matrix layer 5 and the first electrode layer 2 by using the insulating layer 6, so as to avoid affecting a normal use of the first electrode layer 2.

In S400, referring to FIG. 2, a dielectric layer 3 is formed on a side of the first electrode layer 2 away from the base 1.

For example, the dielectric layer 3 may be formed by using a photo-etching process.

In S500, referring to FIG. 2, a second electrode layer 4 is formed on a side of the dielectric layer 3 away from the base 1.

For example, in S500, the second electrode layer 4 may be formed by using the following method: a second electrode material layer is formed on the side of the dielectric layer 3 away from the base 1 by using a magnetron sputtering process; then a second photoresist layer is formed on a side of the second electrode material layer away from the base 1 by using a coating process; then the second photoresist layer is exposed and developed to obtain a patterned second photoresist layer; then the second electrode material layer is etched by using the patterned second photoresist layer as a mask; and then the patterned second photoresist layer is removed to obtain the second electrode layer 4.

Beneficial effects that can be achieved by the method of manufacturing the touch substrate provided in some embodiments of the present disclosure are the same as beneficial effects that can be achieved by the touch substrate 100 provided in some embodiments described above, and details will not be repeated herein.

In some embodiments, the method of manufacturing the touch substrate may further include the following step: after S500, referring to FIG. 2, a protective layer 7 is formed on a side of the second electrode layer 4 away from the base 1.

For example, the protective layer 7 may be formed by using a photo-etching process.

Figure 17:
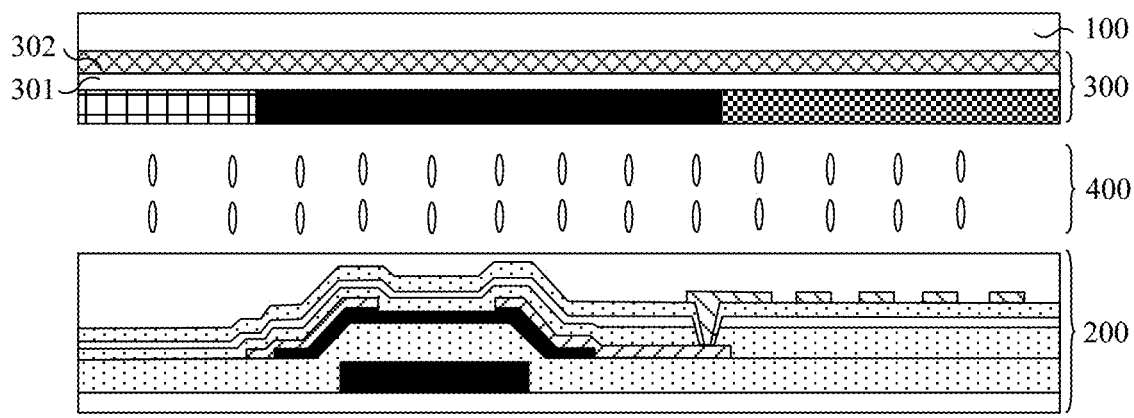
FIG. 17 is a structural diagram of a touch display panel, in accordance with some embodiments.
Figure 18:
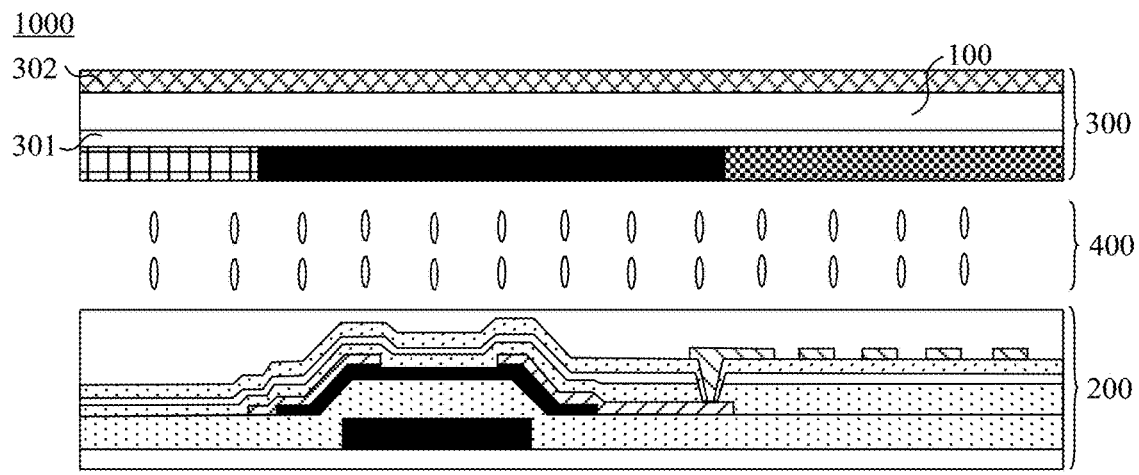
FIG. 18 is a structural diagram of another touch display panel, in accordance with some embodiments of the present disclosure.
Figure 19:
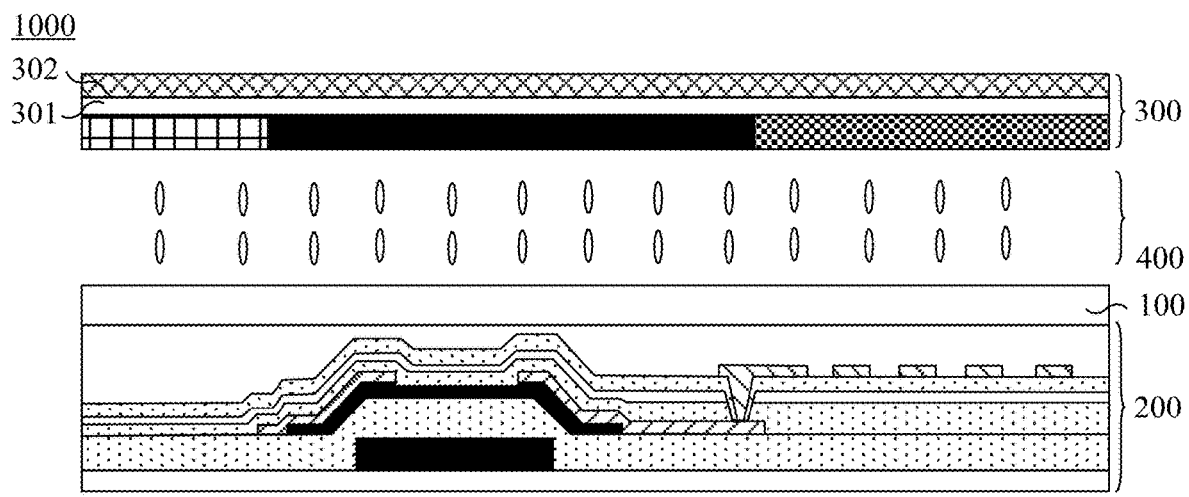
FIG. 19 is a structural diagram of yet another touch display panel, in accordance with some embodiments of the present disclosure.

Some embodiments of the present disclosure further provide a touch display panel 1000. As shown in FIGS. 17 to 19, the touch display panel 1000 includes the touch substrate 100 as described in any one of the above embodiments.

In some embodiments, the touch display panel 1000 may be a liquid crystal display (LCD) touch display panel, an organic light-emitting diode (OLED) touch display panel, and a quantum dot light-emitting diode (QLED) touch display panel or a touch display panel of any other type.

Since the touch substrate 100 in the touch display panel 1000 has a same structure and same beneficial effects as the touch substrate 100 in any one of the above embodiments, details will not be repeated herein.

There are various structures of the touch display panel 1000, and the structure thereof is related to an arrangement of the touch substrate 100. Herein, the structure of the touch display panel 1000 is schematically described by taking an example in which the touch display panel 1000 is the LCD touch display panel.

In some examples, as shown in FIGS. 17 to 19, the touch display panel 1000 further includes an array substrate 200 and a counter substrate 300 that are disposed opposite to each other, and a liquid crystal layer 400 disposed therebetween. The counter substrate 300 includes a base substrate 301 and a polarizer 302 disposed on a side of the base substrate 301 away from the array substrate.

For example, as shown in FIG. 17, the touch substrate 100 may be disposed on a light-exit side of the touch display panel 1000, i.e., a side of the counter substrate 300 away from the array substrate 200. In this case, the touch display panel 1000 may be referred to as an out-cell touch display panel.

For example, as shown in FIG. 18, the touch substrate 100 may be disposed between the base substrate 301 and the polarizer 302. In this case, the touch display panel 1000 may be referred to as an on-cell touch display panel.

For example, as shown in FIG. 19, the touch substrate 100 may be disposed on a side of the array substrate 200 proximate to the liquid crystal layer 400. In this case, the touch display panel 1000 may be referred to as an in-cell touch display panel.

Figure 20:
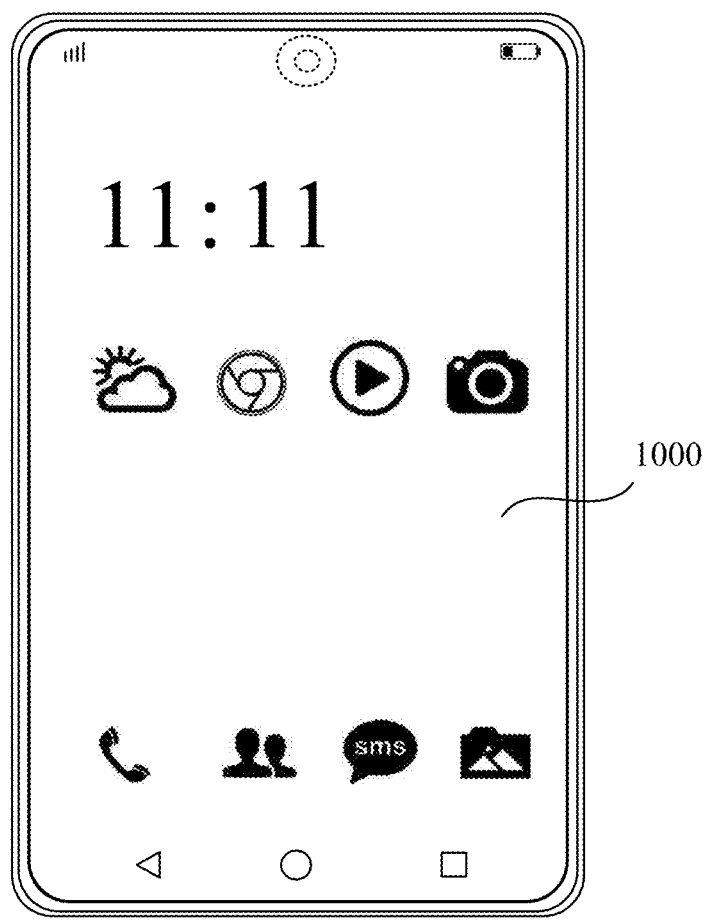
FIG. 20 is a structural diagram of a touch display apparatus, in accordance with some embodiments of the present disclosure.

Some embodiments of the present disclosure provide a touch display apparatus 2000. As shown in FIG. 20, the touch display apparatus 2000 includes the touch display panel 1000 described in any one of the above embodiments.

Of course, the touch display apparatus 2000, for example, may further include structures such as a housing.

Since the touch display apparatus has the touch display panel described in any one of the above embodiments of the touch display panel, it has same beneficial effects, and details will not be repeated in the present disclosure.

In some embodiments, the touch display apparatus 2000 may be a mobile phone, a tablet computer, a television, a computer screen, a digital photo frame, a navigator, or a touch display apparatus of any other type.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A touch substrate, comprising:
   a base; and
   a first electrode layer, a dielectric layer and a second electrode layer that are stacked in sequence on the base; wherein
   the first electrode layer has a plurality of first electrode regions and a plurality of first auxiliary regions that extend in a first direction and are alternately arranged in sequence in a second direction, and the second electrode layer has a plurality of second electrode regions and a plurality of second auxiliary regions that extend in the second direction and are alternately arranged in sequence in the first direction, the first direction intersects the second direction; wherein
   the first electrode layer includes a first mesh electrode disposed in each first electrode region; the first mesh electrode includes a plurality of first mesh sub-electrodes and a plurality of second mesh sub-electrodes that are alternately arranged in the first direction and are electrically connected in sequence; and a region where each first mesh sub-electrode is located overlaps a second electrode region, a region where each second mesh sub-electrode is located overlaps a second auxiliary region, and a density of cells of the first mesh sub-electrode is less than a density of cells of the second mesh sub-electrode; and
   the second electrode layer includes a second mesh electrode disposed in each second electrode region; the second mesh electrode includes a plurality of third mesh sub-electrodes and a plurality of fourth mesh sub-electrodes that are alternately arranged in the second direction and are electrically connected in sequence; and a region where each third mesh sub-electrode is located overlaps a first electrode region, a region where each fourth mesh sub-electrode is located overlaps a first auxiliary region, and a density of cells of the third mesh sub-electrode is less than a density of cells of the fourth mesh sub-electrode.

2. The touch substrate according to claim 1, wherein a ratio of the density of the cells of the first mesh sub-electrode to the density of the cells of the second mesh sub-electrode is approximately 1:2; and/or
   a ratio of the density of the cells of the third mesh sub-electrode to the density of the cells of the fourth mesh sub-electrode is approximately 1:2.

3. The touch substrate according to claim 1, wherein the density of the cells of the first mesh sub-electrode is substantially the same as the density of the cells of the third mesh sub-electrode; and/or
   the density of the cells of the second mesh sub-electrode is substantially the same as the density of the cells of the fourth mesh sub-electrode.

4. The touch substrate according to claim 1, wherein mesh electrodes included in the first electrode layer and mesh electrodes included in the second electrode layer each include:
   a plurality of first electrode lines extending in a third direction, and a plurality of second electrode lines extending in a fourth direction,
   the plurality of first electrode lines and the plurality of second electrode lines intersecting to form cells of the mesh electrode, and the third direction intersecting the fourth direction.

5. The touch substrate according to claim 4, wherein a ratio of the density of the cells of the first mesh sub-electrode to the density of the cells of the second mesh sub-electrode is approximately 1:2,
   a ratio of a distance between two adjacent first electrode lines in the first mesh sub-electrode to a distance between two adjacent first electrode lines in the second mesh sub-electrode is approximately 2:1; and a ratio of a distance between two adjacent second electrode lines in the first mesh sub-electrode to a distance between two adjacent second electrode lines in the second mesh sub-electrode is approximately 2:1; and/or
   a ratio of the density of the cells of the third mesh sub-electrode to the density of the cells of the fourth mesh sub-electrode is approximately 1:2, a ratio of a distance between two adjacent first electrode lines in the third mesh sub-electrode to a distance between two adjacent first electrode lines in the fourth mesh sub-electrode is approximately 2:1; and a ratio of a distance between two adjacent second electrode lines in the third mesh sub-electrode and a distance between two adjacent second electrode lines in the fourth mesh sub-electrode is approximately 2:1; and/or the density of the cells of the first mesh sub-electrode is substantially the same as the density of the cells of the third mesh sub-electrode, a distance between two adjacent first electrode lines in the first mesh sub-electrode is substantially the same as a distance between two adjacent first electrode lines in the third mesh sub-electrode; and a distance between two adjacent second electrode lines in the first mesh sub-electrode is substantially the same as a distance between two adjacent second electrode lines in the third mesh sub-electrode; and/or the density of the cells of the second mesh sub-electrode is substantially the same as the density of the cells of the fourth mesh sub-electrode, a distance between two adjacent first electrode lines in the second mesh sub-electrode is substantially the same as a distance between two adjacent first electrode lines in the fourth mesh sub-electrode; and a distance between two adjacent second electrode lines in the second mesh sub-electrode is substantially the same as a distance between two adjacent second electrode lines in the fourth mesh sub-electrode.

6. The touch substrate according to claim 4, wherein in an orthogonal projection of a combination of the first electrode layer and the second electrode layer on the base, a distance between projections of two adjacent first electrode lines is in a range from 100 μm to 400 μm; and a distance between projections of two adjacent second electrode lines is in a range from 100 μm to 400 μm.

7. The touch substrate according to claim 4, wherein a line width of each first electrode line is in a range from 3 μm to 10 μm; and a line width of each second electrode line is in a range from 3 μm to 10 μm.

8. The touch substrate according to claim 1, wherein a shape of cells of a mesh electrode included in the first electrode layer and a shape of cells of a mesh electrode included in the second electrode layer each include at least one of a rectangular shape, a square shape, and a rhombic shape.

9. The touch substrate according to claim 1, wherein in the second electrode layer, no mesh electrode is provided in a region overlapping the region where the second mesh sub-electrode is located in the second auxiliary region.

10. The touch substrate according to claim 9, wherein a density of cells of an orthogonal projection of a combination of the first mesh sub-electrode and the third mesh sub-electrode on the base is substantially the same as a density of cells of an orthogonal projection of the second mesh sub-electrode on the base.

11. The touch substrate according to claim 10, wherein a pattern of the orthogonal projection of the combination of the first mesh sub-electrode and the third mesh sub-electrode on the base is substantially the same as a pattern of the orthogonal projection of the second mesh sub-electrode on the base.

12. The touch substrate according to claim 1, wherein in the first electrode layer, no mesh electrode is provided in a region overlapping the region where the fourth mesh sub-electrode is located in the first auxiliary region.

13. The touch substrate according to claim 12, wherein a density of cells of an orthogonal projection of a combination of the first mesh sub-electrode and the third mesh sub-electrode on the base is substantially the same as a density of cells of an orthogonal projection of the fourth mesh sub-electrode on the base.

14. The touch substrate according to claim 13, wherein a pattern of the orthogonal projection of the combination of the first mesh sub-electrode and the third mesh sub-electrode on the base is substantially the same as a pattern of the orthogonal projection of the fourth mesh sub-electrode on the base.

15. The touch substrate according to claim 1, wherein the first auxiliary region includes a first auxiliary sub-region overlapping the second auxiliary region; and the second auxiliary region includes a second auxiliary sub-region overlapping the first auxiliary region;

the first electrode layer includes a third mesh electrode disposed in the first auxiliary sub-region; and the third mesh electrode is electrically insulated from the first mesh electrode;

the second electrode layer includes a fourth mesh electrode disposed in the second auxiliary sub-region; and the fourth mesh electrode is electrically insulated from the second mesh electrode; and a density of cells of an orthogonal projection of a combination of the first mesh sub-electrode and the third mesh sub-electrode on the base is substantially the same as a density of cells of an orthogonal projection of a combination of the third mesh electrode and the fourth mesh electrode on the base.

16. The touch substrate according to claim 15, wherein a pattern of the third mesh electrode is the same as a pattern of the first mesh sub-electrode; and a pattern of the fourth mesh electrode is the same as a pattern of the third mesh sub-electrode.

17. The touch substrate according to claim 1, wherein the first auxiliary region includes a first auxiliary sub-region overlapping the second auxiliary region; and the second auxiliary region includes a second auxiliary sub-region overlapping the first auxiliary region; and the first auxiliary sub-region or the second auxiliary sub-region is provided with a fifth mesh electrode, and a density of cells of an orthogonal projection of the fifth mesh electrode on the base is substantially the same as a density of cells of an orthogonal projection of a combination of the first mesh sub-electrode and the third mesh sub-electrode on the base, wherein the fifth mesh electrode is disposed in the first auxiliary sub-region, the fifth mesh electrode is located in the first electrode layer; the fifth mesh electrode is electrically insulated from the first mesh electrode; or the fifth mesh electrode is disposed in the second auxiliary sub-region, the fifth mesh electrode is located in the second electrode layer; and the fifth mesh electrode is electrically insulated from the second mesh electrode.

18. A touch display panel, comprising the touch substrate according to claim 1.

19. A touch display apparatus, comprising the touch display panel according to claim 18.

20. A touch substrate having a touch region and a peripheral region surrounding the touch region, the touch substrate comprising a base, and a black matrix layer, a first electrode layer, a dielectric layer and a second electrode layer that are stacked in sequence on the base; wherein the black matrix layer is located in the peripheral region;

the first electrode layer has a plurality of first electrode regions and a plurality of first auxiliary regions that extend in a first direction and are alternately arranged in sequence in a second direction, and the second electrode layer has a plurality of second electrode regions and a plurality of second auxiliary regions that extend in the second direction and are alternately arranged in sequence in the first direction, the first direction intersecting the second direction;

the first electrode layer includes a first mesh electrode disposed in each first electrode region, and a plurality of first touch leads disposed in the peripheral region, and the plurality of first touch leads are connected to first mesh electrodes in the plurality of first electrode regions;

the second electrode layer includes a second mesh electrode disposed in each second electrode region, and a plurality of second touch leads disposed in the peripheral region, and the plurality of second touch leads are connected to second mesh electrodes in the plurality of second electrode regions;

the first mesh electrode includes a plurality of first mesh sub-electrodes and a plurality of second mesh sub-electrodes that are alternately arranged in the first direction and are electrically connected in sequence; a region where each first mesh sub-electrode is located overlaps a second electrode region, a region where each second mesh sub-electrode is located overlaps a second auxiliary region;

the second mesh electrode includes a plurality of third mesh sub-electrodes and a plurality of fourth mesh sub-electrodes that are alternately arranged in the second direction and are electrically connected in sequence; and a region where each third mesh sub-electrode is located overlaps a first electrode region, a region where each fourth mesh sub-electrode is located overlaps a first auxiliary region;

in the first electrode layer, no mesh electrode is provided in a region overlapping the region where the fourth mesh sub-electrode is located in the first auxiliary region, and a region overlapping the second auxiliary region in the first auxiliary region is provided with a third mesh electrode that belongs to the first electrode layer, and the third mesh electrode is electrically insulated from the first mesh electrode; in the second electrode layer, no mesh electrode is provided in a region overlapping the region where the second mesh sub-electrode is located in the second auxiliary region, and a region overlapping the first auxiliary region in the second auxiliary region is provided with a fourth mesh electrode that belongs to the second electrode layer, and the second electrode layer is electrically insulated from the second mesh electrode; and a density of cells of the first mesh sub-electrode, a density of cells of the third mesh sub-electrode, a density of cells of the third mesh electrode and a density of cells of the fourth mesh electrode are substantially the same; a density of cells of the second mesh sub-electrode and a density of cells of the fourth mesh sub-electrode are substantially the same; and a density of cells of an orthogonal projection of a combination of the first mesh sub-electrode and the third mesh sub-electrode on the base, a density of cells of an orthogonal projection of a combination of the third mesh electrode and the fourth mesh electrode on the base, a density of cells of an orthogonal projection of the second mesh sub-electrode on the base, and a density of cells of an orthogonal projection of the fourth mesh sub-electrode on the base are substantially the same.

\* \* \* \* \*